United States Patent [19]

Greif et al.

[11] Patent Number: 5,371,675
[45] Date of Patent: Dec. 6, 1994

[54] SPREADSHEET PROGRAM WHICH IMPLEMENTS ALTERNATIVE RANGE REFERENCES

[75] Inventors: Irene Greif, Newton Center; Richard A. Landsman, Hingham; Robert Balaban, Cambridge, all of Mass.

[73] Assignee: Lotus Development Corporation, Cambridge, Mass.

[21] Appl. No.: 893,084

[22] Filed: Jun. 3, 1992

[51] Int. Cl.$^5$ .................. G06F 15/00; G06F 15/38
[52] U.S. Cl. ..................... 364/419.1; 364/419.12; 364/419.18; 364/419.19; 364/419.07; 395/148; 395/152; 395/161
[58] Field of Search ............... 364/419, 419.1, 419.12, 364/419.18, 419.19, 419.07; 395/161, 148, 152

[56] References Cited

U.S. PATENT DOCUMENTS 5,101,476  3/1992  Kukla ........................ 395/200

OTHER PUBLICATIONS

Running Microsoft Excel, Version 3 © 1991, published by Microsoft Press, "Working with Multiple Windows" pp. 159–175.

"Third Generation Spreadsheets", BYTE, Product Focus, Feb. 1990, pp. 150–163.
Microsoft Excell Function Reference, 1992 (pp. 373—378).
Microsoft Excell User's Guide 2, 1992 (Chapter 2).

*Primary Examiner*—Roy N. Envall, Jr.
*Assistant Examiner*—Gita D. Shingala
*Attorney, Agent, or Firm*—Fish & Richardson

[57] ABSTRACT

A computer programmed to represent a spreadsheet that can be displayed to a user, the spreadsheet including an array of cells for storing user entered data, the programmed computer including programmed logic for designating a group of one or more cells within the spreadsheet, the group of one or more cells containing a first set of user entered data; programmed logic for creating an alternative for the group of one or more cells, said alternative containing a second set of user entered data that is different from the first set of user entered data; and programmed logic for enabling the user to select between the group of one or more cells and the alternative as the source of the data that is used in a corresponding group of cells within the spreadsheet.

20 Claims, 16 Drawing Sheets

| Range | Alternative | Creator (modifier) | Date | Note |
|---|---|---|---|---|
| PRODUCTION [B9..E.9] | | | | |
| | Best Case | J. Arles | 10/17/91 | Projected production figures of 1992 |
| | Worst Case | B. Nova (L. Jones) | 10/5/91 (11/1/91) | Jim's first stab at the best case Ughh!.... |
| SALARY [B10..E10] | | | | Projected salaries for 1992 |
| | ~~Best Case~~ | B. Nova | 9/23/91 | Great!.... |
| | Good case | H. Vegro (S. Smith) | 11/2/91 (11/4/91) | 7% raise from 1991 |

FIG 9

SPREADSHEET PROGRAM WHICH IMPLEMENTS ALTERNATIVE RANGE REFERENCES

BACKGROUND OF THE INVENTION

The invention relates to a spreadsheet application program which supports range references.

Commercially available spreadsheet programs, such as Lotus 1-2-3 ™ by Lotus Development Corporation, provide users with an electronic worksheet for organizing and manipulating data. Such a worksheet can, for example, be configured so that when displayed on a computer screen it looks and functions like a financial spreadsheet.

The worksheet typically consists of a rectangular grid of cells that provides a structure for entering and calculating data and for organizing and storing information. Each cell can store at least three types of data, namely, labels, values and formulas. Labels are text, such as "Sales" or "Inventory", which can be used to identify and visually organize the values that are entered in a worksheet. Values are numbers. Formulas are expressions that combine labels, values and cell references and functions to yield a label or value as a result.

In some previously available programs, formulas could include any combination of mathematical operations from simple arithmetic, such as addition, subtraction, multiplication, division and exponentiation, etc., to advanced financial and statistical analysis. In such programs, when the user enters a formula into a cell, the program typically calculates the formulas result and displays that result for the cell. In addition, a formula can refer to a range of cells (i.e., a set of one or more contiguous cells) that contains data that the formula will process. For example, in 1-2-3 ™ one such function is referred to as the "at sum" function and has the following form: @SUM(<<range>>), where <<range>> specifies a range of cells. The @SUM function sums the values of the cells in the specified range to produce a result.

Many other functions, similar to the @SUM function, exist in currently available spreadsheet programs for processing data within a range of cells to produce a result. Such functions may be used in financial worksheets, for example, to compute such frequently needed financial statistics as net income, total operating expenses, average costs, to name a few.

Users frequently rely on spreadsheet programs to carry out what-if analyses, i.e., if we use this set of numbers what is the result?. With commercially available spreadsheet programs, a user typically carries out a what-if analysis by changing a series of numbers within the worksheet and reviewing the results of the subsequent worksheet recalculation. If the user wants to capture that new view of the worksheet, he must save it as a separate file or build a complex set of lookup tables. Each time the user wants to see how a new set of numbers or formulas would affect the worksheet, he must repeat this sequence of actions.

SUMMARY OF THE INVENTION

In general, in one aspect, the invention features a computer programmed to represent a spreadsheet that can be displayed to a user. The spreadsheet is made up of an array of cells for storing user entered data. The programmed computer includes instructions for designating a group of one or more cells within said spreadsheet, the group containing a first set of user entered data; instructions for creating an alternative for the group, the alternative containing a second set of user entered data that is different from the first set of user entered data; and instructions for enabling the user to select between the group of one or more cells and the alternative as the source of the data that is used in a corresponding group of cells within said spreadsheet.

Preferred embodiments include the following features. The group of one or more cells is a range of contiguous cells within the spreadsheet. The programmed computer also includes instructions for generating one or more event objects that are linked to the alternative and that contain historical information about the alternative. The historical information includes a date of creation of the alternative and a name of a user who created the alternative. The programmed computer also includes instructions for modifying the alternative and the historical information includes a date of modification of the alternative and a name of a user who modified the alternative. The programmed computer further includes instructions for generating a note object that is linked to the alternative, the note object containing user-entered annotations.

In general, in another aspect, the invention features a programmed computer that includes instructions for designating a group of one or more cells within a spreadsheet, the group of one or more cells containing a first set of user entered data; instructions for generating a plurality of alternatives for the group of one or more cells, each alternative of the plurality of alternatives containing a corresponding set of user entered data that is different from the first set of user entered data and from the set of user entered data for the others of the plurality of alternatives; and instructions for enabling the user to optionally select an alternative from among the plurality of alternatives as the source of the data that is used in the plurality of cells within the spreadsheet.

In general, in yet another aspect, the invention features a programmed computer including instructions for designating a plurality of ranges within a spreadsheet made up of an array of cells, each of the plurality of ranges being a corresponding plurality of cells from the array of cells, each of the plurality of ranges of cells containing an associated set of user entered data; instructions for creating an alternative for each of the plurality of ranges, each of the alternatives containing an associated set of user entered data that is different from the user entered data associated with the range to which that alternative corresponds; instructions for enabling the user to designate a subset of the plurality of alternatives to form a scenario; and instructions for enabling the user to select and deselect the scenario as the source of data that is used in the spreadsheet.

Preferred embodiments include the following features. The programmed computer also includes instructions for generating one or more event objects that are linked to the scenario, the event objects containing historical information about the scenario. The historical information includes a date of creation of the scenario and a name of a user who created the scenario. The programmed computer further includes instructions for modifying the scenario and the historical information includes a date of modification of the scenario and a name of a user who modified the scenario. The programmed computer also includes instructions for generating a note object that is linked to the scenario, the note object containing user-entered annotations.

In general, in still another aspect, the invention features a machine readable medium for controlling the operation of a computer. The medium includes instructions for generating a representation of a spreadsheet made up of an array of cells, the array of cells for storing user entered data; instructions for designating a range within the spreadsheet, the range being a plurality of cells from the array of cells, the range of cells containing a first set of user entered data; instructions for generating an alternative for the range, the alternative containing a second set of data that is different data from the first set of user entered data; and instructions for enabling the user to select between the range and the alternative as the source of the data that is used in the plurality of cells within the spreadsheet.

In general, in yet another aspect, the invention features a computer programmed to store a plurality of data elements in a list, wherein at least some of the data elements are duplicates. The programmed computer includes instructions for generating a hash value for each of the data elements; and instructions for generating a list of entries that stores all of the data elements, each of the entries holding a unique one of the data elements and having a hash value derived from that corresponding data element, the entries in the list being sequentially ordered by the hash values.

Preferred embodiments include the following features. The list is a doubly-linked list.

The invention introduces Range Alternatives as a way to create versions of the data in spreadsheet ranges, track changes to models and create what-if scenarios. By combining alternatives from a collection of ranges, the invention also enables the users to construct large scenarios. These features allow the user to experiment with spreadsheet values for large areas of the spreadsheet without creating separate files to store each combination. Range alternatives also carry the name of the user who created the alternative, the date and time it was created, the name of the users who have modified the alternative and the dates it was modified, and an annotation that is useful when the spreadsheet must be reviewed and understood by others. Range alternatives are a powerful workgroup versioning tool that makes it possible for many people to contribute data or annotations to the spreadsheet without over-writing work created by others.

By offering a simple and effective way to manage alternatives and spreadsheet annotations, it becomes easier for groups of people to communicate about the spreadsheet. The original structure of the spreadsheet need not change to incorporate new contributions because input can be managed as alternatives to the base spreadsheet. Someone who has been asked to review a model they did not originally create can quickly read the original author's notes, review alternative possibilities and suggest new approaches.

The invention is particularly useful in applications such as budgeting and forecasting, auditing changes to a spreadsheet model and commenting on and reviewing work by others. It will also be useful to individuals who use the spreadsheet for what-if analysis and need to track alternative versions of the file over time.

Other advantages and features will become apparent from the following description of the preferred embodiment and from the claims.

DESCRIPTION OF THE PREFERRED EMBODIMENT

FIG. 9 illustrates an "Index by Range" output display;

Figure 1:
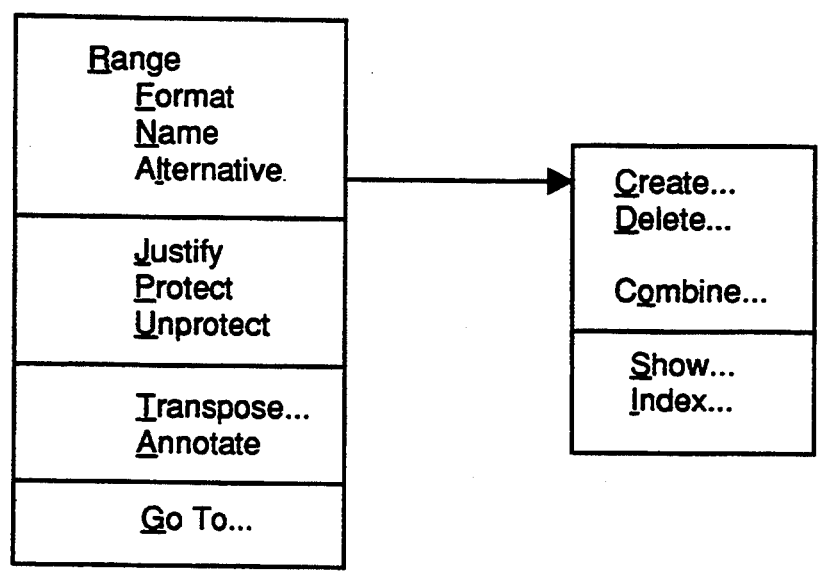
FIG. 1 shows a drop-down menu from a spreadsheet program which embodies the invention.

First an overview of the functionality of the invention will be presented. Then, the details of an implementation will be described.

I. Overview

The invention extends the functionality that is available through a typical spreadsheet application program. In the described embodiment, the spreadsheet application program is Lotus 1-2-3/W ™, the Windows spreadsheet program from Lotus Development Corporation. The environment in which Lotus 1-2-3/W runs is any IBM- compatible 80286 or 80386 that can run in standard and enhanced mode. The operating system is DOS with Microsoft Windows ™. The following description assumes a familiarity with the functionality and operation of the 1-2-3 family of spreadsheet programs. It should be understood, however, that the invention is not limited to use only in the 1-2-3 spreadsheet environment and has general applicability to any spreadsheet program.

A spreadsheet program that embodies the invention can also be referred to as a versionable spreadsheet program. The versionable spreadsheet program provides functionality that allows one or more users of a spreadsheet application program to maintain a series of different assumptions for sets of numbers (or formulas or labels) in a worksheet.

The versionable spreadsheet program offers a new granularity to saving data in a worksheet. It allows users to capture just the changed values and store them, with annotation, for future use or review. Each set of assumptions is captured as an alternative for a named range of cells in the worksheet. A number of discontiguous alternatives can be referenced together as a scenario.

In the following description, a named range is a cell or contiguous range of cells which have been given a name by the user; whereas, an unnamed range is a cell or contiguous range of cells designated by coordinates, e.g. A:A1 or C:B5..DG10.

A. Alternatives

The concept of the alternative is the core feature of the versionable spreadsheet program. Alternatives are versions of named ranges. They are tightly coupled with ranges in the worksheet, and the contents of the Alternatives are maintained by a versionable spreadsheet addin for the underlying spreadsheet program. Alternatives have creators and modifiers.

The versionable spreadsheet addin allows manipulation of alternatives in ways that are easy and familiar to users of the underlying spreadsheet program. Indeed, the added capabilities are extensions of the functionality of the underlying program. With the extensions, alternatives can be saved with named ranges. This enables the user to create what can be thought of as a hierarchy as illustrated in the following example:

Inflation Rates—Range Name
  High Rates—Alternative 1
  Medium Rates—Alternative 1
    Medium Rates—Alternative 2
    Medium Rates—Alternative 3
  Low Rates—Alternative 1

Alternatives always have the same extent (dimensions) and location as the range to which they belong.

The versionable spreadsheet addin uses a file metaphor for manipulating alternatives. Alternatives have names. There is no restriction on the number of range alternatives that can exist (except memory limitations).

The following terms are used in this description to refer to the operations on alternatives:

| Term | Explanation |
| --- | --- |
| Save | Users save the current state of ranges (e.g. values, formulas and styles) from the worksheet to memory. Saving an alternative does not cause it to be saved to disk. Users must still do File Save to permanently record changes to the file. |
| Retrieve | Users retrieve alternatives from memory to the worksheet. |
| Current alternative | The current alternative for a range is the one displayed in the worksheet. |
| Current range | If the worksheet cursor is in a named range, that is the current range; otherwise no range is current. |
| Location | The cell coordinate of the upper left, frontmost cell in the range. This optionally includes the file name. If no file name is given, the current file is assumed. |
| Extent | The number of rows, columns and worksheets in the range. |

Other terminology is used as defined by 1-2-3.

An alternative saves all cell data in a range including numbers, labels, and formulas. The default behavior is for alternatives to capture all cell style attributes. However, users can set their preference to capture none of the cell style attributes. Cell style attributes include basic attributes, such as cell format (1-2-3 formats) and protection status, and extended attributes, such as font (including size), style, foreground and background color, cell border, shading, and drop shadow. Alternatives can capture only cell-based style information; they do not capture other worksheet attributes, such as column width and row height.

In addition to those properties normally associated with ranges, the versionable spreadsheet program maintains other properties for alternatives, including Name, Date/Time, Creator Name, Modifier Name, Annotation, and Sequence number.

When a user creates an alternative, it must be named. Once the alternative has been created, the name cannot be modified. Each alternative may have one annotation to allow the user to describe the contents of the alternative and that annotation may be modified by users at any time. When the alternative is created, the user name of the creator is recorded as the creator. Each time a user modifies the alternative, the program records the user name of the modifier and the date and time.

Also, alternatives have sequence numbers. The first time an alternative is saved, its sequence number is 1. New alternatives of the same name are assigned ascending sequence numbers (2, 3, 4, etc.) in the order in which they are created.

B. Scenarios

The versionable spreadsheet program provides users with ways to collect and manipulate a number of alternatives together as a whole. Such a collection of alternatives is called a scenario. Scenarios are useful for grouping alternatives that have some logical relationship to one another, and causing a number of alternatives to be displayed in the sheet with a single user operation.

Scenarios have names and they reference alternatives by file name, range name, alternative name, and creator name. Within a given scenario, only one alternative per range is allowed. An alternative, however, may be a member of any number of scenarios. Scenarios may reference alternatives from more than one file. The user can specify and modify the order in which alternatives are listed in the scenario and that order determines the order in which the alternatives are retrieved for display.

A worksheet can have multiple scenarios covering various parts of the worksheet and those scenarios can overlap on the worksheet. Thus, when retrieving two scenarios into the worksheet, the retrieval of the second may cause some or all of the data displayed by the retrieval of the first to be overwritten.

The current scenario for a worksheet is the most recent one retrieved into the worksheet. This causes all of the member alternatives of the scenario to be made current. The scenario remains current as long as each of its member alternatives remains current.

In addition to an ordered list of references to alternatives, scenarios have properties that are similar to those defined for alternatives. As with alternatives, some of these may not be modified by users.

C. User Commands

Referring to FIG. 1, the versionable spreadsheet addin adds Range Alternative to the 1-2-3/W drop-down menus. Selecting the Range Alternative option, activates another menu listing operations that the user may perform with range alternatives. Each of the Range Alternative operations will now be described functionally.

1. Range Alternative Create

The Range Alternative Create command saves the contents of a named range to memory and the user specifies a name for the new alternative. Optionally, the user can specify a note, save styles (for example, font and color), and protect and hide the alternative. The user can create an alternative for an existing range name or can create a new range name to contain the alternative. The user can also use this command to modify an existing alternative or to create a new copy of an alternative.

When the user creates or modifies an alternative, the versionable spreadsheet program automatically records the date, time, and user name. The spreadsheet program saves the alternatives when the user saves the worksheet.

Figure 2:
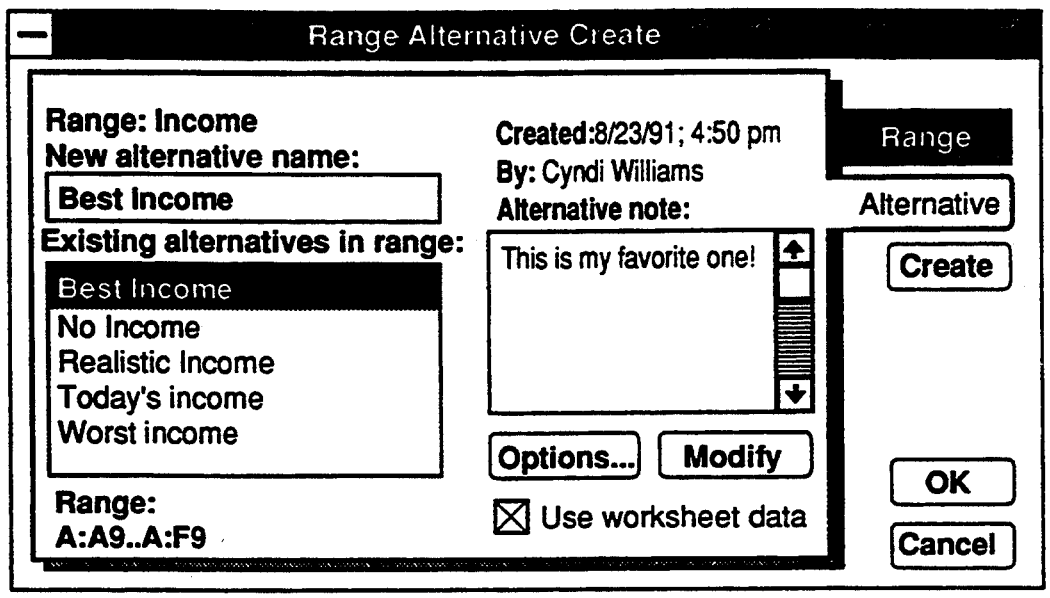
FIG. 2 shows the Alternative portion of a Range Alternative Create dialog box that is accessible through the drop-down menu of FIG. 1.

If the cell pointer is in a named range on the worksheet, selecting Range Alternative Create generates the dialog box shown in FIG. 2. The dialog box includes the following fields and boxes. There is a range field in the upper left that displays the name of the selected range or the named range in which the cell pointer is located. If the cell pointer is in multiple overlapping ranges, the program selects the range whose upper left corner is closest to the cell pointer. There is a box labelled "New alternative name:" that provides a place for the user to enter the name of the new alternative being created. A box labelled "Existing alternatives in range:" presents an alphabetical list of alternatives associated with the selected range. This box is empty if the range has no associated alternatives. Another field in the lower left labelled "Range:" displays the range address. A field labelled "Created:" specifies the time and date at which the selected alternative was created. A field labelled "By:" identifies the user who created the selected alternative. A box labelled "Alternative note:" provides an area into which the user can enter an annotation that will be associated with the alternative.

If the user selects an existing alternative name from the list box, the Modify, OK, Create, and Options buttons are enabled and the "Created" and "By" information appear. If the user enters a new alternative name, the Create, OK, and Options buttons are enabled. When the user selects Create, the new alternative is added to the "Existing alternatives in range" list box and the dialog box changes to its initial state (i.e., empty). When the user selects Modify, the alternative is updated with whatever changes were made and the dialog box changes to its initial state. The user can select "Use worksheet data" on the menu and the program updates the selected alternative with the contents of the named range.

Figures 3, 5:
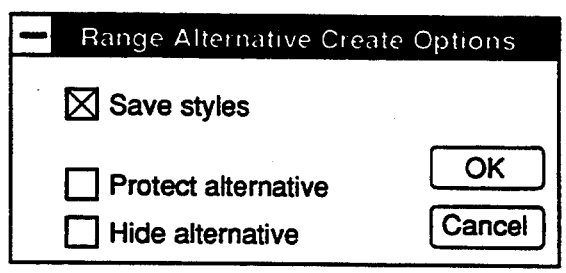
FIG. 3 shows a Range Alternative Create Options menu.
FIG. 5 shows a Range Alternative Show menu that is accessible through the drop-down menu of FIG. 1.

By selecting the "Options" button, the menu shown in FIG. 3 appears and the user is then able to specify the cell information that the program is to save with the alternative and whether the data in the alternative will be protected or hidden. The default is that "Save styles" is selected. If "Save styles" is active, the program saves the current color, border, font, shadow, shading, and 1-2-3 cell format of each cell in the alternative. If the user selects "Protect alternative", the program prevents changes to the alternative's data or note. In other words, users cannot modify or delete protected alternatives. Finally, if "Hide alternative" is selected, the program prevents the alternative's data from being displayed in the worksheet. A user cannot delete or copy a hidden alternative. Also, a hidden alternative is listed only in the Range Alternative Create box and it does not appear in an Index or in any other list of alternatives.

Figure 4:
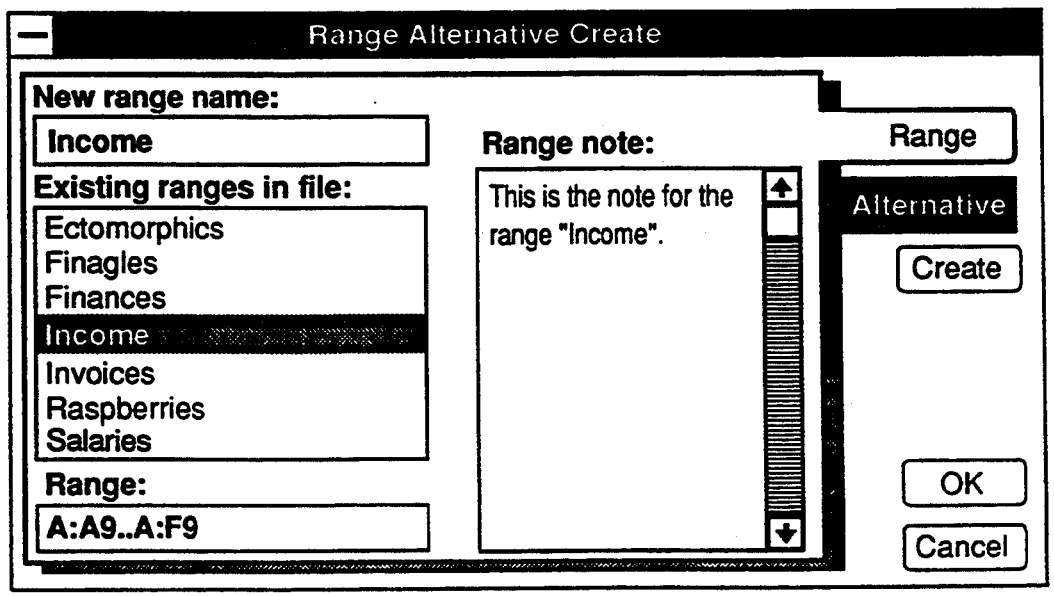
FIG. 4 shows the Range portion of a Range Alternative Create dialog box.

When the Alternative button is selected from the menu in FIG. 1 and if the cell pointer is not in a named range or if a named range is not selected, the Range portion of the Range Alternative Create dialog box appears (see FIG. 4). This enables a user to create a new range name to contain the alternative or to select an existing range name from the list box. If the user selects an existing range name from the list box, the Alternative button is enabled. If the user enters a new range name, the Create and OK buttons are enabled. When the user selects Create, the Alternative command button is enabled and the dialog box changes to its initial state.

2. Range Alternative Show

The Range Alternative Show command enables the user to move the cell pointer to the upper left corner of a range with alternatives, to display a border around the range, and to show (put) a selected alternative in the range. When invoked, a Range Alternative Show menu, as illustrated by FIG. 5 appears. The name of the selected range or the range in which the cell cursor is located appears in a box labelled "Range". The user can generate a drop-down box that contains an alphabetical listing of all ranges with alternatives. The name of the current alternative of the selected range appears in a box labelled "Alternative". This area is grayed out if the user has modified the range since displaying the alternative and it is blank if the user has deleted the most recent alternative or if no range name appears in the Range drop-down. A drop-down box is available that contains an alphabetical listing of all alternatives associated with the selected range.

3. Range Alternative Delete

Figure 6:
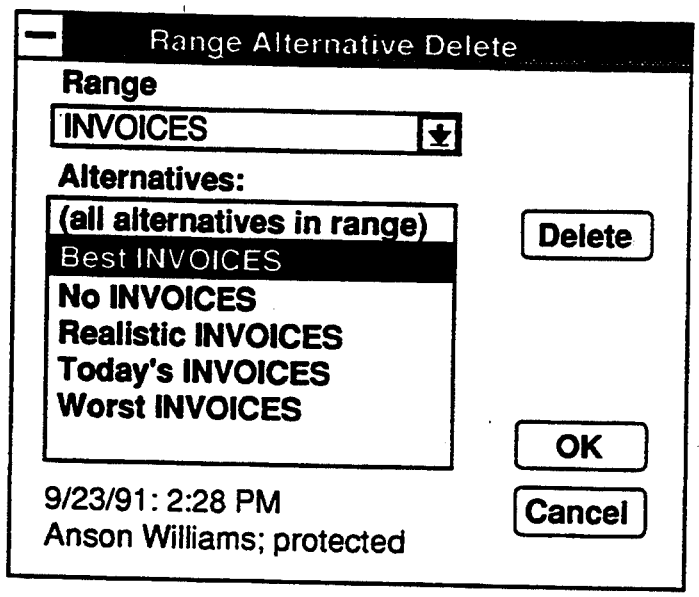
FIG. 6 shows a Range Alternative Delete dialog box.

Referring again to FIG. 1, the Range Alternative Delete command deletes an alternative name and its contents from memory. When selected, the dialog box shown in FIG. 6 appears. The user can display a drop-down box showing a list of ranges associated with the current worksheet. When the user selects a range name from the drop-down box, its associated alternatives appear in the Alternatives list box. When the user selects an alternative name, the Delete and OK buttons are enabled, and the creator name/date is displayed below the Alternatives list box.

4. Range Alternative Combine

The Range Alternative Combine command copies alternatives from one range to another. The destination range must be in the current worksheet file. The source range can be in the current file or another open worksheet file. Both ranges must have the same dimensions.

5. Range Alternative Index

Figure 7:
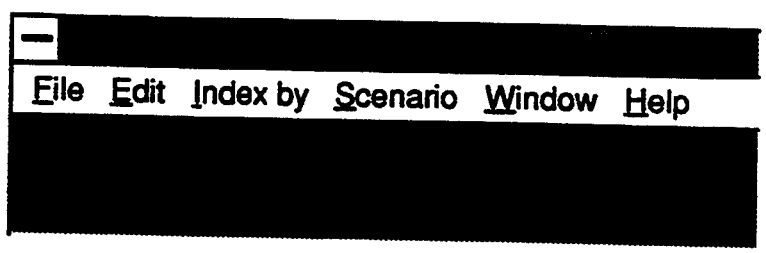
FIG. 7 shows an Alternative Index window.

The Range Alternative Index command brings up an Alternative Index window (see FIG. 7) in which the user can view sorted and filtered indexes of information about ranges, alternatives, and scenarios. From this window, the user can also go to a range in the worksheet window and show a specified alternative, and the user can show all the alternatives that constitute a scenario.

Figure 8:
FIG. 8 shows the drop-down menus that are available through the Alternative Index window shown in FIG. 7.

The drop-down menus that are available through the Alternative Index window are shown in FIG. 8. The following discussion focuses first on the "Index by" commands that are shown and then on the "Scenario" commands.

(a). Index by Commands

The "Index by" commands define the categorization, order, and scope of items that can be displayed in an Index list box. Each command indicates the top-level Index category. A check mark indicates the current Index category. Range is the default. The "Index by" selection is "sticky" during a spreadsheet programs session i.e. it remains in effect throughout the session until it is changed by the user. For example, if the user chooses "Index by Scenario", closes the Index window, and then opens it again, the previously selected "Index by" option will be used.

The Alternative Index window displays the Index for the last worksheet that was current before the user made the Alternative Index window current. For example, if the user activates the Alternative Index window from the SALES worksheet, the index applies to SALES. If the user then activates the EMPLOYEE worksheet, the Index window displays the index for EMPLOYEE.

The "Index by Range" selection displays an alphabetical index of ranges and alternatives categorized by ranges (e.g. see FIG. 9). For each range, the program displays range name, address, and at least a portion of the range note. For each alternative, the program displays alternative name, creator, most recent modifier (if any), date of most recent event (creation or modification), and the first portion of the alternative note. There is some visual indication of the current alternative (e.g. it is displayed in bold). There is also a visual indication of whether the user has modified the contents of the range since the user most recently put an alternative in the range (e.g. it is displayed with a strikethrough if it has been modified).

The "Index by Date" selection displays a list of alternatives sorted by date of creation or modification. The index includes the most recent event (creation or modification) that has occurred to each alternative. The events are categorized by date.

The "Index by Contributor" selection displays an alphabetical index of users who have made the most recent transaction (creation or modification) to an alternative. For each contributor, the index includes an alphabetical listing of alternatives for which that user has made the most recent transaction, and the date of that operation. If an alternative has been modified, it appears only under the name of the most recent modifier, not under the name of its creator.

The "Index by Current" selection displays an alphabetical index (by range) of the current alternatives in each range with alternatives. If the user modifies the contents of a range, the name of the alternative that was current prior to the modifications is tagged with a visual indicator (e.g. a strikethrough).

The "Index by Scenario" selection displays an alphabetical index of scenarios and their alternatives for the current file. In the case of cross-file scenarios, the index lists all alternatives, whether or not the worksheet file containing each alternative is open. Alternatives are categorized by scenarios. For each scenario, the program displays scenario name, creator, most recent modifier (if any), date of most recent event (creation or modification), and an initial segment of the scenario note. Alternative names are qualified with the name of the associated range. Deleted alternatives defined to be part of the scenario are included with a visual indicator (e.g. hatchmarks).

The "Index by Alternative" selection displays an alphabetical list of alternative names. Ranges with identical alternative names are categorized under alternatives.

b. Scenario Commands

The Scenario Create command shown in FIG. 8 lets the user specify the group of alternatives that will be combined to create a scenario. With this command, the user can create scenarios that include alternatives from different worksheet files. The user can also create a scenario that has no alternatives. This lets developers build applications from the top down—that is, before they know all alternatives that will participate in a scenario. When the user creates a scenario, the program automatically records the date and time, and the user's name. The spreadsheet program saves the scenario when the user saves the worksheet.

Figure 10:
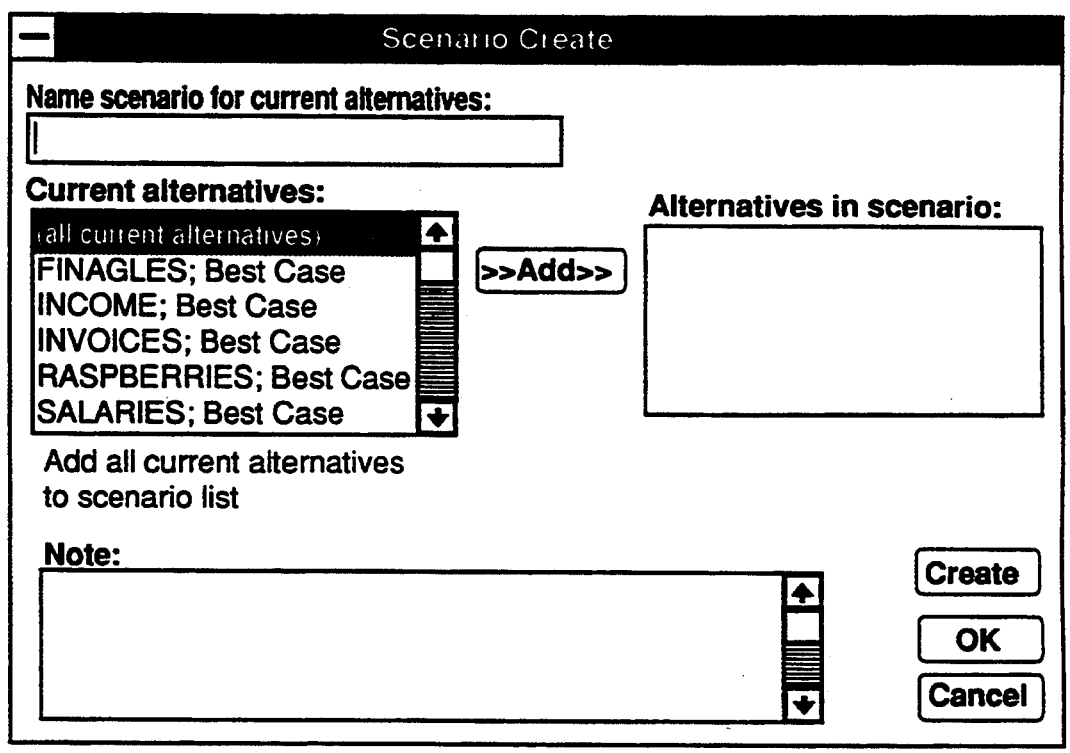
FIG. 10 shows a Scenario Create dialog box.

When the user selects the Scenario Create, the dialog box shown in FIG. 10 appears. The user enters a name for the scenario into a "Name scenario for current alternatives" box. The user can also enter an optional note in a Note box and the note will become associated with the scenario.

A "Current alternatives" box lists the names of alternatives displayed in the current worksheet file (or lists alternatives for all open worksheet files if "Index by File" is the current Index setting). When the user selects an alternative, its creation date and time, creator name, and (if "Index by File" is the current Index setting) source file name appear below the list box.

An "Alternatives in scenario" box lists the names of the alternatives to use for the scenario. An >>Add>> command button enables the user to add an alternative name selected from Current alternatives list box to the "Alternatives in scenario" list box. When the user selects an alternative in the "Alternatives in scenario" list box, the program assumes that the user wants to remove it from the list and toggles the >>Add>> command button to a <<Remove<< command button. <<Remove<< removes the selected alternative name from the "Alternatives in scenario" list box.

A "Create" command button enables the user to create the new scenario from the selected alternatives displayed in the "Alternatives in scenario" list box and changes the dialog box to its initial state. An "OK" command button creates the new scenario and closes the dialog box.

Referring again to FIG. 8, the "Scenario modify" command lets the user add alternatives to or remove alternatives from a scenario. The modified scenario is saved when the user saves the worksheet.

The "Scenario delete" command deletes the scenario specified by the user, but does not delete its alternatives.

The implementation details for a particular embodiment will now be described.

II. Structure and Operation

Figure 11:
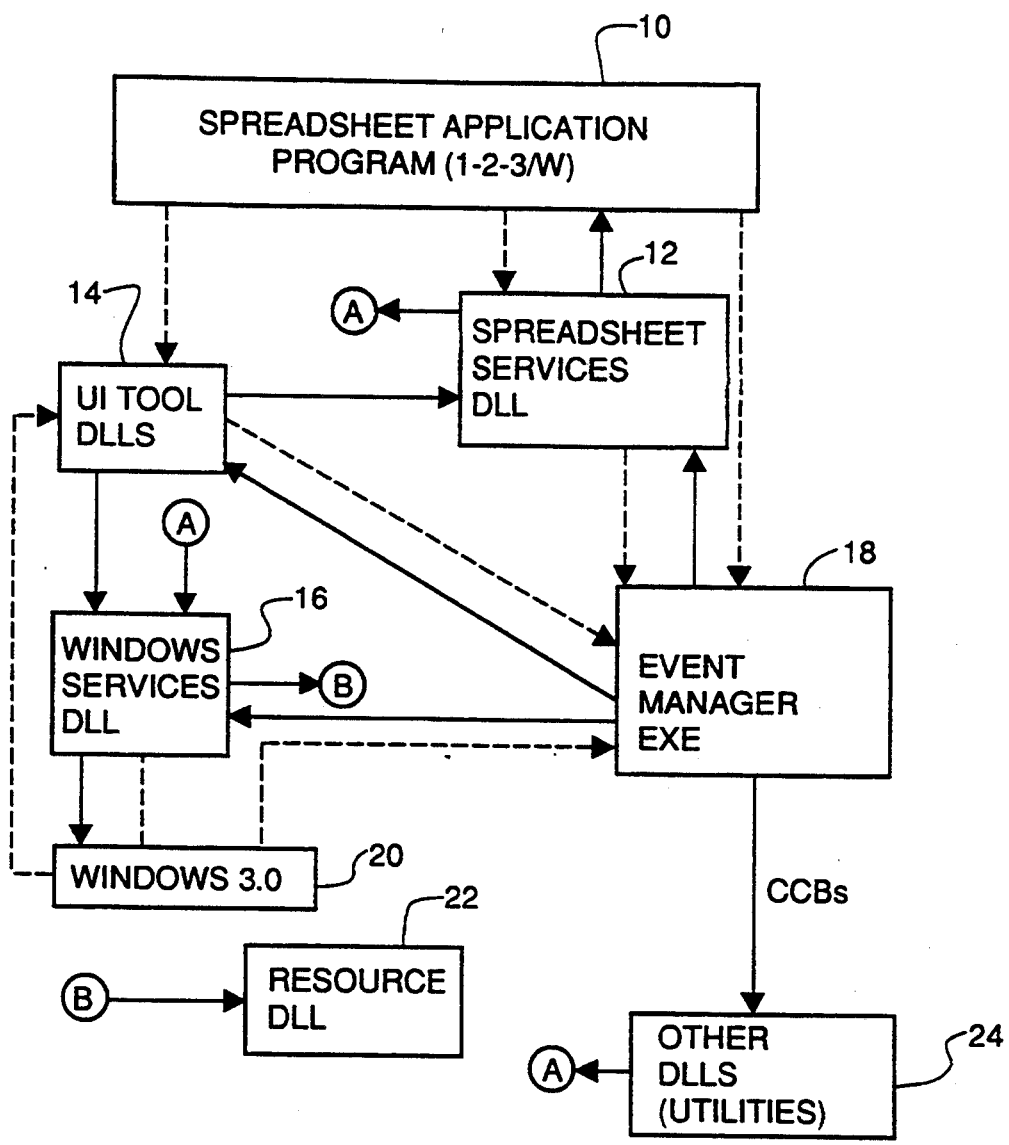
FIG. 11 is a file-oriented block diagram of the module configuration of the invention.

FIG. 11 shows a file-oriented module configuration for the system, indicating which parts of the product are structured as dynamically linked libraries (DLLs) and which as execution (EXE) files, as well as the mechanisms used to communicate among them. The primary modules include a spreadsheet application program module 10, a Spreadsheet Services interface module 12, a Tools module 14, a Window Services module 16, an Event Manager module 18, a Windows module 20, a Resource module 22 and a Utilities module 24. In FIG. 11, the solid lines connecting one module to another indicate a control call from an originating module to a receiving module. The dashed lines indicate an event callback. Also, to simplify the figure and avoid intersecting lines, control calls to Window Services module 16 are shown as directed to a circle containing an "A" and control calls to Resource module 22 are shown as directed to a circle containing a "B". Each of the modules and their operation will now be described.

In the described embodiment, spreadsheet application program module 10 is the Lotus 1-2-3/W program by Lotus Development Corporation. It enables the user to define and reference ranges of cells within a spreadsheet. The majority of the interaction with the spreadsheet program by other modules is through particular interfaces of that program. Only one of the other above-mentioned modules makes calls into the spreadsheet program module, namely, Spreadsheet Services interface module 12.

Spreadsheet Services module 12 is a DLL module that interfaces directly to spreadsheet program module 10. Module 12 is implemented as a DLL so that it can be called by other modules, such as, Tools module 14. All other modules that wish to execute spreadsheet operations do so through Spreadsheet Services module 12. Other modules with callback functions resident within them may use Spreadsheet Services module 12 to register those callback functions to receive event notifications from spreadsheet program module 10. This is shown in FIG. 11 by dotted lines, representing callback notifications, connecting spreadsheet program module 10 to other modules, e.g. Tool module 14 and Event Manager module 18. In addition, Spreadsheet Services module 12 itself may register its own callback functions to provide specific functionality for other modules that do not want to receive the notifications directly from spreadsheet program module 10. Spreadsheet Services module 12 also contains its own addin shell, allowing it to communicate directly with spreadsheet program module 10.

Tools module 14 implements one or more tools (e.g. a Viewer) which provide the user with a view of what is going on in the system, implements its own window and relies heavily on both Spreadsheet Services module 12 and on Windows services module 16. Additionally, each tool makes heavy use of several other services, including, for example, a user interface (UI) data store (see Settings Storage Manager described later), a memory manager, and other utilities. These utilities reside in Utilities module 24 which is a group of DLLs.

Each tool is called by the mainline code during startup to register one or more callback functions (represented by the solid line from Event Manager 18 to Tool module 14 in FIG. 11). These callbacks are used to invoke tool commands by sending information to Event Manager 18 (represented by the dotted line from tools module 14 to Event Manager 18.). The actual command processors for all commands reside in Event Manager 18 and its associated DLLs.

Each UI tool registers callbacks (such as window and dialog procedures) with Windows Services module 16, and receives various event notifications directly from the Windows operating environment. Tools use Resource module 22 to store all of their resources (strings, dialog templates, menus, icons, etc.).

If a tool window is closed, the tool unregisters all of its callback functions with the application, Spreadsheet Services module 12 and Windows services module 16.

All external event and command input goes into Event Manager 18. Event Manager 18 and all other application modules (as distinct from the interface modules, such as Windows Services module 16 and Spreadsheet Services module 12) together comprise the application layer. The only routines in Event Manager 18 (i.e., the EXE file) that can be called by outside modules (including other DLLs) are callback functions, which may be explicitly registered with spreadsheet application program 10 or Windows module 20 through the appropriate interface module.

Windows Services module 16 is a DLL, which like Spreadsheet Services module 12, serves to insulate overall system functionality from platform dependencies. The role of Windows Services module 16 is to wrapper all Windows calls in a fashion appropriate for use by other modules.

Resource module 22 is a DLL that consists entirely of resources. Access to Resource module 22 is controlled by a resource manager, which resides in Windows Services module 16. Even though the diagram does not show all modules calling into Windows Services module 16, this is required for any module that wants to access resources.

In addition to the utilities mentioned above (e.g., memory manager), most of the rest of the system code is broken up into a series of DLLs. They interact freely via direct call invocations with any other system DLL. They are not be able to call any routines in Event Manager 18.

The functionality that is implemented by these modules now be described in greater detail.

A. Assumption Manager

Figure 12:
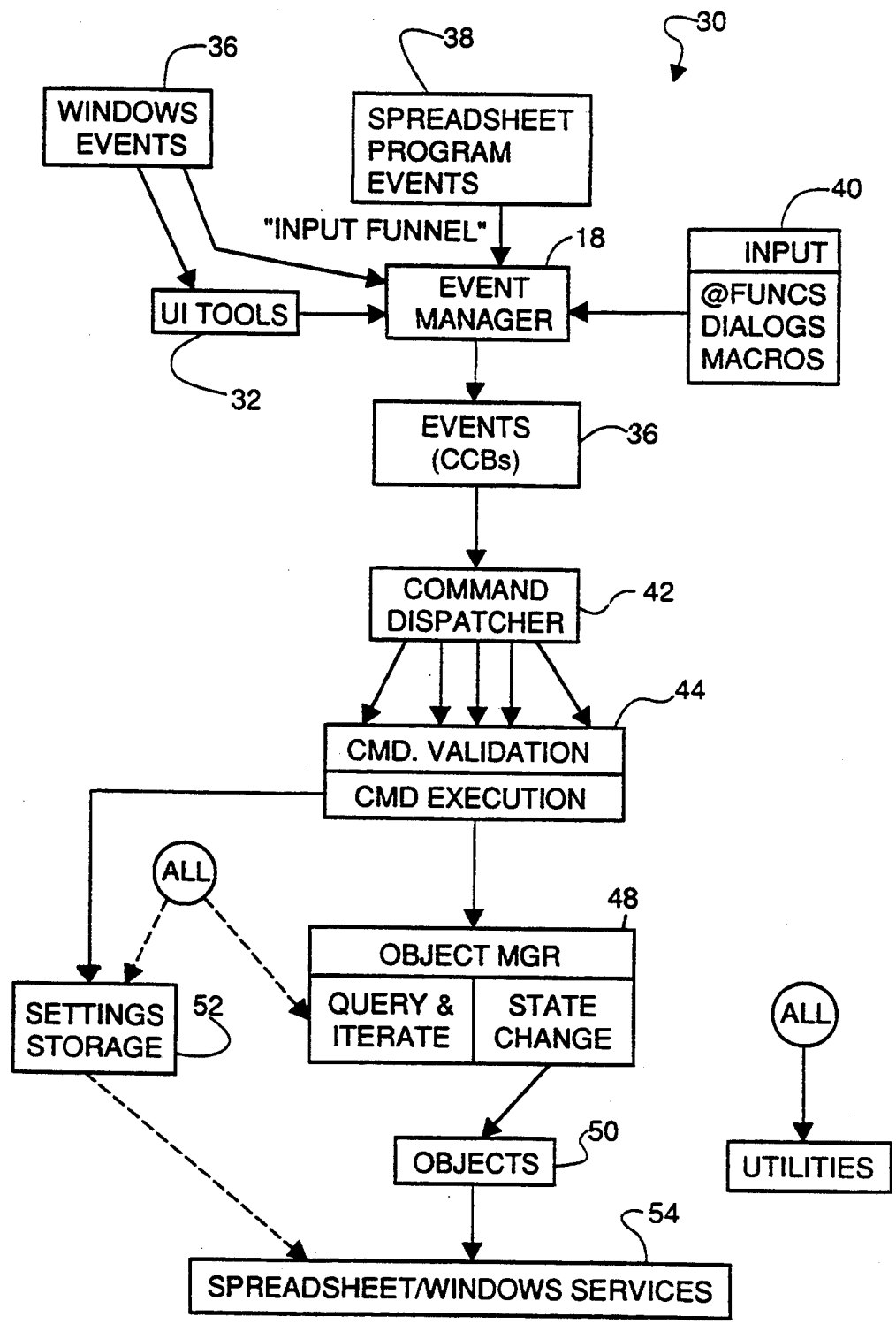
FIG. 12 is a file-oriented block diagram of the Assumption Manager.

Referring to FIG. 12, at the heart of the above-described system, is an Assumption Manager 30 that implements the alternative range references. Assumption Manager 30 consists of two major user interface (UI) components, namely, a viewer window 32, which is implemented as a spreadsheet program "tool", and overloaded spreadsheet program menu commands and dialogs 34, which appear to the user to be a normal part of the spreadsheet. It is implemented as an addin, and as such has a DLL that can be loaded by spreadsheet application program 10 as its main spreadsheet interface module. Assumption Manager 30 registers several @functions and macro keywords with spreadsheet application program for special execution and evaluation. Appendix I lists @functions and macro keywords that are supported.

Assumption Manager 30 includes Event Manager 18 which provides isolation from both the operating platform (e.g. Microsoft Windows TM) and from the host spreadsheet. All possible input events relevant to Assumption Manager 30 are understood by Event Manager 18. This includes, for example, events 38 from the spreadsheet application program interfaces (navigation, menu picks, and keystrokes); and versionable spreadsheet input 40 such as @function and macro keyword invocations. This module translates all such external events into a fixed set of event data structures, in the form of Command Control Blocks (CCBs), each including a command identifier with a list of arguments appropriate to the command. For any given command, its complete set of required and optional arguments is known.

Versionable spreadsheet dialog boxes are invoked by menu picks in the spreadsheet, or by UI gestures in the viewer. They provide argument collection and validation (though not necessarily complete validation).

Event Manager 18 monitors certain spreadsheet application program events 38. It also receives viewer input and input related specifically to the versionable spreadsheet functionality.

The system monitors the following kinds of Windows events:
 command and menu selection messages from versionable spreadsheet menu items;
 KEYUP/DOWN events; and
 Spreadsheet window activation/deactivation events (these cause the set of current objects to change); and The versionable spreadsheet addin registers for a large number of events with the interfaces of the spreadsheet application program. A partial list of events includes: navigation events; "Before" events on some spreadsheet program menu choices; "After" events on certain menu choices; and other non-menu events (range fixup, data entry, help, etc.). "Before" and "after" events enable the user to specify whether notification should occur "before" the event actually occurs, or "after" its successful execution. The spreadsheet application program notifies the Assumption Manager callback at the appropriate time, and Assumption Manager 30 updates state information, performs fixups, executes commands, etc.

Event Manager 18 also monitors @Functions and Macro Keywords that are specific to the versionable spreadsheet functionality. When a formula containing a versionable spreadsheet @function is evaluated by the spreadsheet cell engine, a call is made to the registered Assumption Manager routine. The registered routine extracts argument information and does validation, then computes the result of the @function and returns that result. Macro keywords that are specific to versionable spreadsheet functionality work in a similar fashion.

The viewer, which is implemented as an addin tool as part of Tools module 32, runs in its own document window on the spreadsheet program desktop. Its main function is to provide a UI which allows users to make sense of the hierarchy of versionable spreadsheet objects and regular spreadsheet objects (e.g. workfiles, ranges, alternatives, scenarios, audit trails). It also provides UI for some other versionable spreadsheet commands.

The viewer uses Windows services directly to implement most of its UI. It queries versionable spreadsheet information from a Settings Storage manager and an Object manager (to be described shortly) and executes commands by sending information to Event Manager 18.

Event Manager 18 translates all input events into Command Control Blocks (CCBs) 36 and passes them on to a command dispatcher 42. CCB's 36, which encapsulate all the relevant information required to execute a user command, serve to isolate the UI of the versionable spreadsheet addin from the code that implements the underlying functionality. Each CCB 36 contains a command id and a list of arguments, which can be of any data type, and are specific to the command (see detailed discussion found elsewhere). Command dispatcher 42 is simply a dispatch table which routes CCBs 36 to appropriate command processors 44. Syntactic argument validation is performed by the UI component calling Event Manager 18. Event Manager 18 performs other argument validation. Final semantic validation is handled by the individual command processors 44.

The Scenario Show command is a good example of how validation is distributed. (It is invoked by double clicking on a scenario.) The UI validates the user input to this command, i.e., the name of the Scenario to display. If the given name is a real Scenario, a CCB is created and dispatched to command processor 44. Command processor 44 then decides if it is really okay to retrieve that Scenario, i.e., none of the Alternatives is hidden; all Alternatives may legitimately be retrieved (e.g., none of the ranges contains protected cells if global protection is on), etc.

There is a command processor 44 for each CCB emitted by Event Manager 18. This layer embodies the semantics of the versionable spreadsheet program and can be viewed as the "Versionable Spreadsheet Services" layer. Each command processor 44 implements a high level command by making use of an object manager 48, individual objects 50 (e.g., Alternatives, etc.), a settings storage manager 52 and/or spreadsheet/windows services 54.

Each command processor 44 is responsible for saving information on the spreadsheet application program Undo stack and for deallocating its CCB as required. Any argument validation not done by Event Manager 18 or the UI is completed by the appropriate command processor 44. Each Command Processor 44 is designed as two distinct layers, namely, command validation and command execution. The validation code is responsible for performing the required final checks on the command CCB and returning error codes if there is a problem. This allows reporting to be done back to the user while the dialog (for example) is still visible. The execution code actually runs the command.

Settings Storage manager (SSM) 52 is responsible for maintaining all UI and other "settings" in a local database. Some of the settings are global to the workspace, others to a single workfile. Some settings are UI related, others, such as user preferences, are functional.

The following is a partial list of the kinds of information maintained by SSM 52:
 Name of current user
 State of the tool window (e.g. position, open, closed)
 "Sticky" setting for the UI
 User preferences
 State of each named range The kinds of functionality exported by SSM 52 includes:
 Initialize
 Update
 Change user preference
 Query preference SSM 52 is used as a cache for internal state information, both public and private. It is queried by command processors 44, object manager 48, the Viewer, and versionable spreadsheet dialogs. SSM 52 is updated by command processors 44 as the result of a CCB being processed or by the UI. It is also updated directly by dialog procedures with "sticky" settings.

Object manager 48 functions as a set of containers for the basic versionable spreadsheet objects. Container objects incorporate generic, not specific, functionality. Object manager 58 provides the following services for all containers:

Add an object
Delete an object
Iterate over objects
Search for an object (using various criteria)

The basic versionable spreadsheet objects are: Spreadsheet, Range, Alternative, Scenario, Annotation and Audit. The Spreadsheet, Range, Alternative and Scenario object types are each managed by a container object in object manager 48. Annotation and Audit object instances are attached to an Alternative or Scenario object. There is no more than one Annotation and one Audit object per Alternative or Scenario object. There is one special case of the Annotation and Audit objects, which belong to the workfile as a whole. Each workfile has a single file level Annotation and Audit instance.

Spreadsheet services layer 54 isolates the versionable spreadsheet addin from spreadsheet program dependencies. Spreadsheet services are divided into a series of subsystems, some of which use only Windows services, some of which use only spreadsheet program services, and some which use both.

A memory subsystem uses Windows. The memory subsystem uses a sub-allocating memory manager. The basic algorithm allocates large "heaps" of memory, each using a single segment handle, from Windows. The sub-allocator manages chunks of memory out of these heaps for specific use.

B. Versionable Spreadsheet Object Hierarchy

The following is a more detailed description of the object hierarchy and the important data structures and methods. The components of the design described in this section are internal, meaning that they offer no public interface for use by other clients. All access to the versionable spreadsheet objects is through the Object Manager, described elsewhere.

Figure 13:
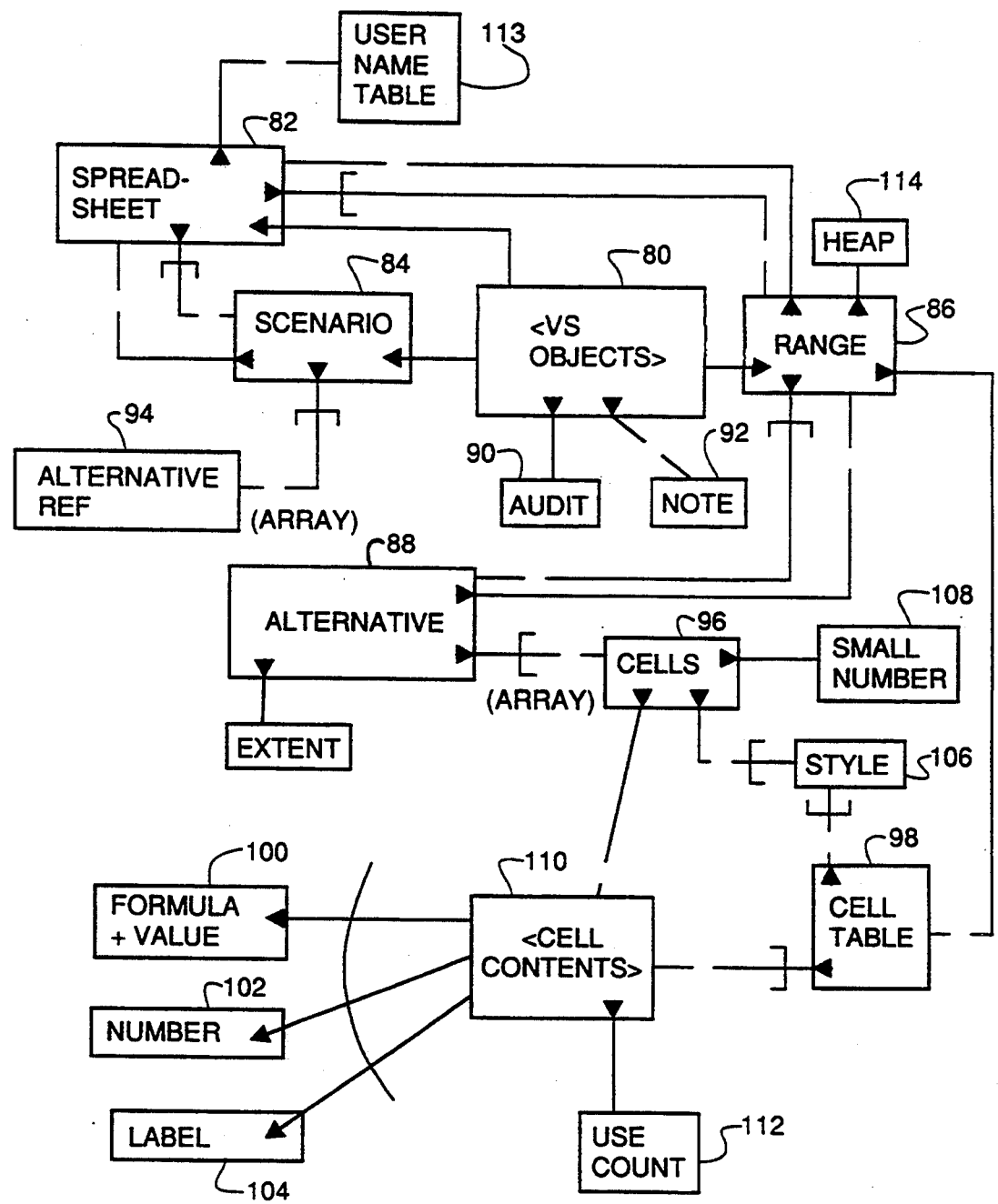
FIG. 13 shows the object hierarchy for the invention.
Figure 14:
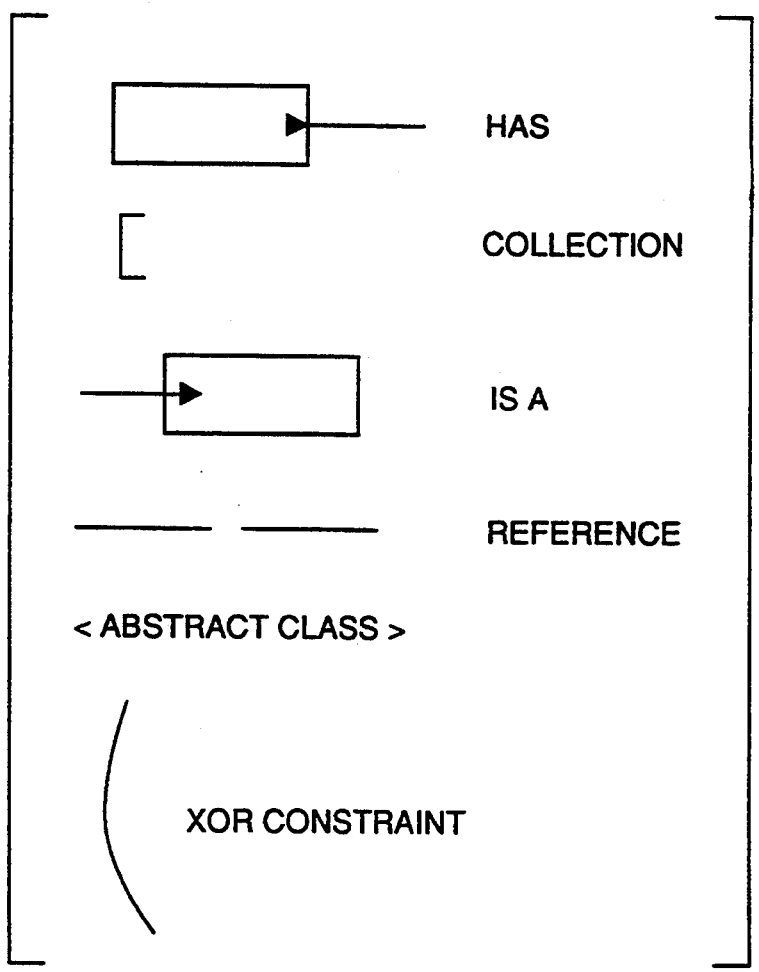
FIG. 14 shows the convention used to illustrate the relationship between objects in FIG. 13.

FIG. 13 shows the relationship of versionable spreadsheet objects to each other. (The convention used in FIG. 13 to depict the relationships among objects is shown in FIG. 14.) There is a Versionable Spreadsheet (VS) Object Abstract Class 80. "VS Object" class 80 is an abstract C++ class which is used to derive specific kinds of VS objects such as, Spreadsheet objects 82, Scenario objects 84, and Alternative objects 88. The Spreadsheet object 82 sits at the top of the hierarchy and owns a set of Range objects 86 and Scenario objects 84 that are associated with the spreadsheet. A Range object 86 owns a set of Alternative objects 88 representing the alternatives for that range. Each VS object contains a name, a pointer to an Audit object 90 and a pointer to a Note object 92. The class also implements methods for accessing and creating Audit and Note objects 90 and 92.

A VS object always references an Audit object 90, which is created at the same time the VS object is constructed. Note objects 92 are optional; they exist for a VS object if the user has entered annotation.

Audit objects 90 maintain a history of "interesting" events which affect the object to which they are attached (e.g. historical events such as date of creation and modification as well as the identity of the user who caused the event). Upon creation, they know how to get the system date and time and, for network versions, know how to get the name of the spreadsheet user. The Audit object can be given an event code or an arbitrary string. It also knows how to "render" itself for printing (i.e., convert event codes to strings).

A Note object 92 simply contains a text string.

Scenario objects 84 contain a list of references to Alternative objects. They know how to iterate over Alternatives and to apply various functions to them. Scenario objects 84 also reference the spreadsheet object to which they belong.

Scenario objects 84 do not keep pointers to actual Alternative objects 88. The reference is encapsulated in a utility class called AlternativeRef 94, which simply remembers the file name, range name, alternative name, and creator name of the referenced Alternative objects 88. AlternativeRef objects 94 know how to find the referenced Alternative object 88 (via the Object Manager), if it exists.

This means that, from the point of view of the VS object hierarchy, Scenario objects 84 are not limited to referencing Alternatives objects 88 that actually exist when the Scenario object is created. Another implication is that Alternative objects 88 do not know directly which Scenario objects 84 they participate in. If a Scenario object 84 references an existing Alternative object 88 which is later deleted, the Scenario object 84 is not updated automatically.

Alternative objects 88 reference an array of cells 96, through which cell contents can be accessed. For convenience, they also reference a range object 86 to which they belong.

Range objects 86, in turn, reference a list of Alternative objects 88, and each range object 86 maintains a cell table 98 of unique cell contents (values and/or formulas). In the described embodiment, range objects 86 are derived from the VS Object abstract class but do not contain audit trails or annotations. A range object 86 is instantiated when an alternative object 88 is first created for the range. Each range object 86 knows the location and extent of the range, as well as its name. Range objects 86 know how to move on the spreadsheet, resize, become undefined, and delete all their Alternative objects 88.

Range objects 86, like scenario objects 84, also reference the spreadsheet object 82 to which they belong.

Cell Table object 98, which is maintained by a range object 86, is a collection of unique cell contents. There is one Cell Table object 98 per range object 86. Each Cell Table Object 98 maintains the cell contents collection as 3 lists: a list of formula objects 100, a list of number objects 102 and a list of label objects 104. The list of number objects 102 is ordered by numeric hash value; the list of label objects 104 is ordered by the value of a numeric hash applied to the label; and the list of formula objects 100 is ordered by the value of a numeric hash applied to the compiled formula bit stream.

Cell Table object 98 knows how to add and remove individual formulas, numbers and labels, and also knows how to determine if a formula, number or label already exists in the table.

Cell Table object 98 also has a collection of cell style members 106, which represent all the style information for the cells in the range.

There is one instance of a Cell Contents Abstract Class 110 (i.e., a class derived from this class) for each unique number, label and formula belonging to the range object 86. At the abstract class level, the class contains only a use count 112. This number is a count of the number of cells in the range which references it.

Cell contents abstract class 110 has methods for setting and accessing the actual contents. There is also a virtual IsA method for returning the type code of a derived class object, and a virtual=(assignment) operator.

Three classes are derived from Cell contents abstract class 110, namely, formula objects 100, number objects 102, and label objects 104. A formula object 100 contains a pointer to the compiled formula code. There are derived class methods to set and get the formula and to evaluate the formula. Number objects 102 contain 10 byte floating point numbers. As noted above, "small" numbers (i.e., two byte numbers) are stored in a cell object 108. There are derived class methods to set and get the number. A Label object 104 is a null terminated string of no more than 512 bytes, including a label prefix character.

Each Alternative object 98 contains a list of cells 96, where there is one cell object 108 for each location in the range to which the Alternative object belongs. This list is not sparse, since generally there will be very few cases where an Alternative contains cells which are empty and have default style. Each cell object within the list of cells also points to a cell contents entry and a style entry in the range's cell table 98.

For efficiency of memory use, cells which contain small numbers (16 bits) store the value in a cell object 108, instead of in a Cell Contents object. Also, Cell objects 108 know how to point to a Cell Contents object.

A Spreadsheet object 82 holds workfile level audit and annotation data, and it "owns" the list of Scenario objects 84 and the list of Range objects 84 which belong to that spreadsheet workfile. It also contains file specific "settings", which are maintained through the Settings Storage Manager (SSM) API. Spreadsheet object 82 is identified by workfile pathname.

Spreadsheet object 82 owns a user name table 113 that identifies a set of user names for all people who have created or modified objects in that workfile. Spreadsheet object 82 also contains some flags that enhance access for fixups: one indicating the existence of cross-file Scenarios, one indicating the existence of cross-file formulas.

Functions

The functions that are implemented by the different objects will now be described.

VS Object abstract class 80 implements the following methods:
 Get object name
 Replace object name
 Add audit event
 Get first audit event date
 Get last audit event date
 Format Audit event
 Flush audit events (before date?)
 Flush all but last n audit events
 Get note
 Replace note
 Delete note Scenario Object class 84 implements the following methods:
 Get Alternative at position n in the list
 Get number of Alternatives
 Add Alternative at position n
 Append Alternative
 Remove Alternative
 Display Alternatives Alternative Object class 88 implements the following methods:
 Set cell
 Get cell
 Get range name
 Get range location
 Get extent
 Resize extent
 Display in sheet Spreadsheet object 82 anchors collections of ranges and scenarios, which are implemented as ordered linked lists. Its public methods are:
 Get cross file formula flag
 Set cross file formula flag
 Get cross file scenario flag
 Set cross file scenario flag
 Find range from name
 Find scenario from name
 Add/remove scenario
 Add/remove range For access to settings, there are some public methods used by the Setting Storage Manager API to store and retrieve id/value pairs. These are discussed in the description of the Settings Storage Manager found elsewhere.

The range object 86 maintains a collection of Alternative objects 88 and maintains a collection of Cell Contents objects that are encapsulated by a Cell Table object 98. The collection of Alternatives is implemented as a linked list, ordered by hash value of the name.

Referring to FIG. 13, range object 86 maintains a heap handle 114, from which all referenced objects (Alternatives, Cell Contents, Cell Table, etc.) belonging to the range are allocated. Range object 86 implements the following public methods:
 Find Alternative (from name)
 Display Alternative
 Count Alternatives
 Create Alternative
 Delete Alternative
 Copy Alternative
 Get name
 Get location
 Get extent
 Move
 Undefine
 Delete
 Resize extent
 Get first Alternative
 Get current Alternative
 Set current Alternative There is one Cell Table object 98 per range. Each Cell Table Object 98 encapsulates a collection of unique Cell Contents objects derived from cell contents abstract class 110. It is implemented as a linked list. Its public methods are:

| | |
|---|---|
| Add value | Increases use count only if the value is already in the table. |
| Add formula | |
| Add label | |
| Add style | |
| Remove value | Decreases use count. Removes value if use count is 0. |
| Remove formula | |
| Remove label | |
| Remove style | |

A Cell Object 108 implements the following public methods:
   Get style
   Set style
   Get contents
   Set contents
Cell Contents Object abstract class 110 implements the following public methods:
   Increment use count
   Decrement use count
   Get use count
   (virtual) Get hash value
   (virtual) IsA
Formula objects 100 implement the following public methods:
   Get hash value
   IsA
   Get formula
   Get formula value
   Set formula
   Adjust formula references
Number objects 102 implement the following public methods:
   Get hash value
   IsA
   Get number
   Set number
Label objects 104 implement the following public methods:
   Get hash value
   IsA
   Get label
   Set label
Audit Objects 96 implement the following public methods:
   Add event (code or string)
   Remove event
Audit Event objects (described below in connection with FIGS. 15 and 16) implement the following public methods:
   Format event
   IsA
   Get/Set date and time
   Get/Set event string
   Get/Set event code
   Get/Set user name (name index)
Note Objects 92 implement the following public methods:
   Get note
   Set note 2. List Implementation All linked lists of named objects (e.g. not including Audit Events) are derived from the same linked list class used in the Settings Storage Manager (i.e., an OrderedList class). Most lists are therefore doubly linked and ordered. Some objects maintain collections as sizeable arrays (using the SizeableArray class). For example, the Scenario's list of alternative references is a sizeable array. Alternative object 88 maintains a fixed size array of cell objects.

3. Audit Objects

As noted earlier, audit objects 90 are attached to the objects derived from VS objects abstract class 80 (see FIG. 13). Thus, an alternative object 88 has an attached audit object, a spreadsheet object 82 has an Audit object, and a scenario object has an audit object. Audit objects attached to VS objects are simply a list of events that occurred for that object, such as creation, modification, etc. They are implemented as a linked list of audit event objects.

Figure 15:
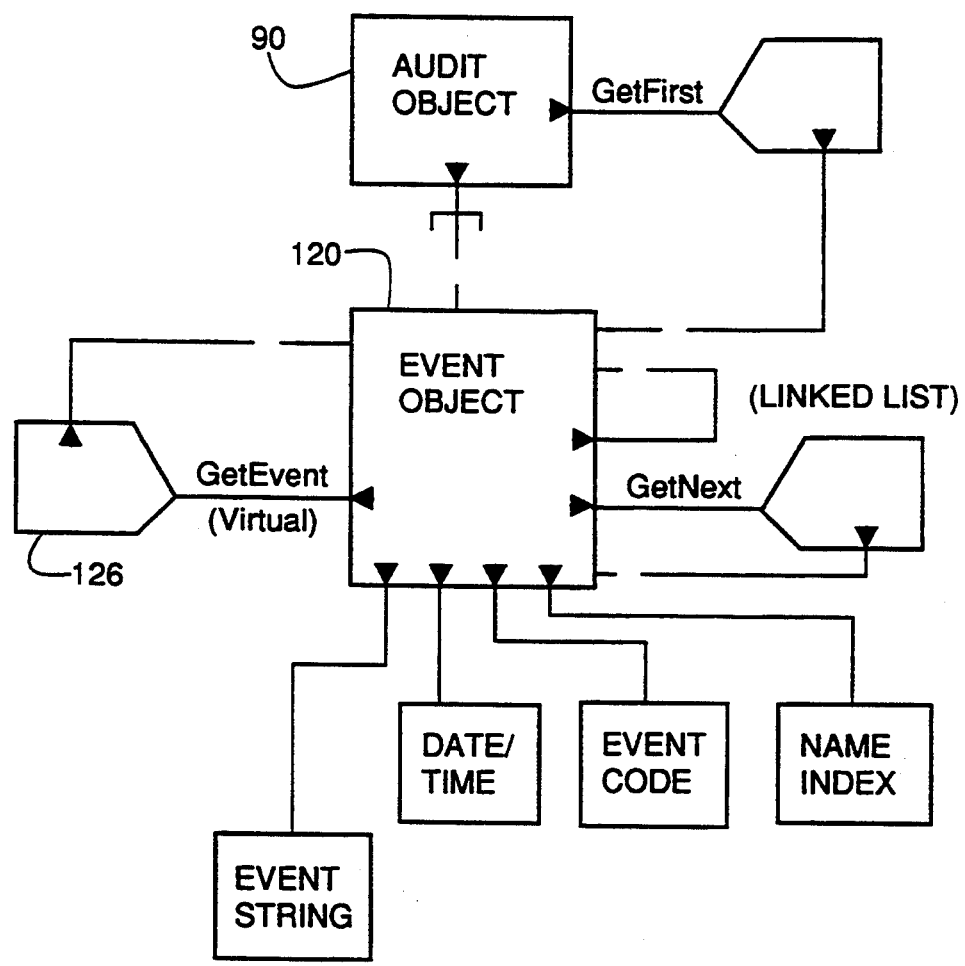
FIG. 15 shows the internal architecture of Audit objects.

Referring to FIG. 15, Audit Objects 90 anchor a list of Audit Event Objects 120. The constructor which creates these objects knows how to get the relevant information that is to be recorded in the Audit Event Object 120. That is, they know how to automatically retrieve the id of the creator/modifier and the creation/modification date that will be stored in the object. Most events are standard: object created, object edited, etc. In order to save memory, the standard event set is represented in Audit Event Objects 120 (see FIG. 15) by integer codes. The actual strings corresponding to these event codes are kept in a resource file for use when formatting events. Additional descriptive text may also be kept in the Audit Event object as a literal string. For an Alternative Copy operation, for example, the object create/copy code may be supplemented by the name of the range and Alternative from which the new Alternative originated.

There is a virtual "GetEvent" method 126 associated with Audit Event object 120.

The modules of Assumption Manager 30 will now be described in greater detail.

C. Event Manager

Referring to FIG. 12, Event Manager 18 shown as the two groups of modules enclosed in boxes with dashed borders, controls all high level event processing in Assumption Manager 30. It translates spreadsheet and certain Windows events into "Versionable Spreadsheet Events", and provides for registration and notification of these events. It also acts as a major interface between the user interface and the "core" of the versionable spreadsheet addin, and between the spreadsheet and versionable spreadsheet addin.

One of the major tasks of Event Manager 18 is to package up Windows and spreadsheet events into CCBs. CCBs encapsulate all the data needs for a single command (note that "command" can include state change triggers which have no UI). CCBs isolate internals to the Versionable spreadsheet addin from direct knowledge of the spreadsheet and of the windowing environment.

Figure 16:
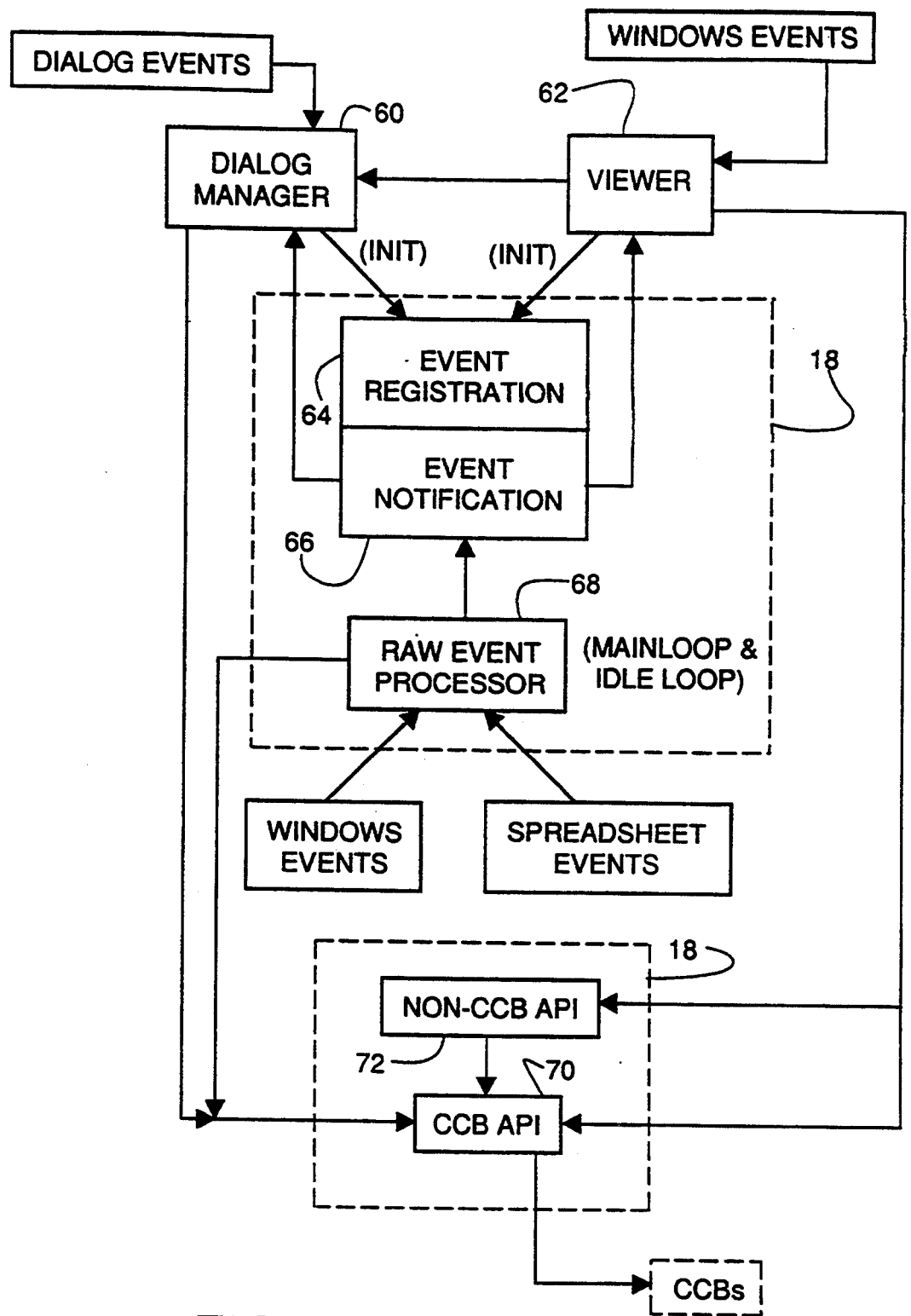
FIG. 16 is a block diagram of the overall structure of the Event Manager and shows its relationship to components with which it interacts.

FIG. 16 shows the overall structure of Event Manager 18, which includes an Event Registration module 64, an Event Notification module 66, a Raw Event Processor 68, a CCB API module 70 and a non-CCB API module 72. FIG. 16 also shows certain modules with which Event Manager 18 interacts. Each module block will now be described in detail.

Event Manager 18 interacts with two functional areas of UI, namely, a Dialog Manager 60 and a Viewer 62. Dialog Manager 60 is the component of the user interface which controls all dialog boxes belonging to the versionable spreadsheet addin. This is not to imply that all the dialog code is in a single UI module, however, event Manager 18 does treat it that way. Dialogs are displayed by the UI as a result of event notifications from Event Manager 18. Event Manager 18 knows only that events are passed to Dialog Manager 60 and that requests for information and action come from Dialog Manager 60. It knows nothing about the correspondence of events to dialogs.

Individual dialog procedures contained within Dialog Manager 60 receive events directly from Windows. All spreadsheet and other "versionable spreadsheet events" come from Event Manager 18.

Though Viewer 62 is another component of the UI, as far as Event Manager 18 knows, there is no real substantive distinction between Viewer 62 and Dialog Manager 60. The only difference is that Viewer 62 may use Non-CCB API 72, whereas Dialog Manager 60 most likely never will.

All versionable spreadsheet and other spreadsheet events come from Event Manager 18, with the possible exception of "tool" events from the spreadsheet program.

The versionable spreadsheet user interface registers for all spreadsheet and other versionable spreadsheet events directly with Event registration module 64 in Event Manager 18. The UI does not register for versionable spreadsheet or standard spreadsheet events directly with any other module (except Windows). Event registration is done at UI initialization time. There is a specific list of events for which the UI may register. This list is maintained in a header file.

The "UI initialization" event is special, because Event Manager 18 "notifies" the UI without any prior registration. The notification in this case is not a callback, but a direct call to a predefined UI initialization routine. In all other cases, an event notification occurs only when a callback has been registered for that event.

Many of the "events" for which the UI registers are simply versionable spreadsheet commands, such as Alternative Create. These commands trigger some action in the UI (a dialog box, for example), followed by a call into the Event Manager's CCB API 70 or Non-CCB API 72 to execute a command known to the versionable spreadsheet addin.

Other events are simply notifications of a state change in the spreadsheet. One example of this type of event is user navigation. The UI wishes to know when the current location of the cell cursor changes, so that tracking information can be displayed to the user. In this case, Event Manager 18 allows a client to specify whether notification should occur "before" the event actually occurs, or "after" its successful execution.

Some "versionable spreadsheet events" may have their origins in both Windows and in the Spreadsheet. Navigation events, for example, could come from a spreadsheet Range Goto command, or from a Windows mouse event (click on a cell). These "raw" events from the outside world are packaged into a single consistent representation. Raw Event Processor 68 translates events defined in spreadsheet and Windows terms into versionable spreadsheet events. The translated events are passed on to Event Notification module 66 and from there on to the registered client.

At startup time, Raw Event Processor 68 registers with the Spreadsheet Services layer for all relevant spreadsheet events. It also establishes one or more invisible versionable spreadsheet windows.

The list of spreadsheet events of interest to the addin is maintained in a table. Each event is marked as either having or not having associated UI. For those events with no UI, Raw Event Processor 68 does not pass translated events to Event Notification module 66, but instead packages them up as CCBs and dispatches them directly to Event Manager's CCB API 70.

CCB API 70 in Event Manager 18 is a public CCB API 70 for command input and execution. CCB API 70 consists of routines to create and populate CCBs, to fill in default parameters from the Settings Storage Manager and to delete CCB's following execution. Non-CCB API 72 also exists for the convenience of UI modules which do not wish to deal with CCBS. Each command has a dedicated routine to call to pass arguments into Event Manager 18. Non-CCB API 72 uses CCB API 70 to package these arguments into CCBs and then dispatch them normally.

1. Event Flow Examples

To illustrate how Event Manager 18 operates, two examples of event flow through Event Manager 18 will now be described. The first example is a command which invokes a dialog box. The second is an event which has no UI associated with it.

Processing of a command with UI involves the following sequence of major steps. (Refer to FIGS. 11 and 17.) First, the user selects a command (e.g. Range Alternative Create) from a menu. In response, the Spreadsheet application program 10 calls a routine in Spreadsheet Services module 12 (the registered callback). Since there are no arguments to this command and no further information is necessary from the spreadsheet program, Spreadsheet Services module 12 calls a registered callback routine in Raw Event Processor 68 in Event Manager 18. Raw Event Processor 68 checks its command table and recognizes the command as a UI command with no arguments. It translates the event to a pre-defined "versionable spreadsheet command" id, and passes it to Event Notification module 66, to determine whether any other module has registered for it.

Event Notification module 64 then calls the UI Dialog Manager's registered routine with the command id. Dialog Manager 60 knows which dialog box is associated with the given command id and calls the Event Manager's CCB API 70 to construct the appropriate CCB for this command. CCB API 70 creates the requested CCB from its "database", and fills in any default values (defaults are flagged in the database and cross-referenced to Settings Storage Manager 62, see FIG. 12). The filled in CCB is returned to Dialog Manager 60. Dialog Manager 60 extracts default and "sticky" values from the CCB (using CCB API 70 and macros) and fills the appropriate controls in the dialog. The dialog is then displayed through the spreadsheet's dialog API (via a call to the Spreadsheet Services layer) or directly via Windows. The UI may access the Spreadsheet Services layer directly in order to propose additional inputs, such as the name of the current range.

All dialogs in the spreadsheet program are modal, therefore dialog events are handled directly by the spreadsheet's dialog manager and by the versionable spreadsheet's UI's dialog processor. The user completes the dialog, and dismisses it (Enter or Cancel). Dialog Manager 0 performs syntactic checking of user input. Assuming all is well and that the user did not Cancel, Dialog Manager 60 extracts user input from the dialog's controls and puts them into the CCB, using the CCB API and macros. Dialog Manager 60 uses CCB API 70 to dispatch the completed CCB to a Command Processor 44 (See FIG. 12). The Command Processor does semantic validation of the CCB arguments, depending on the individual command. If there is an error (e.g. cannot create the Alternative because the name is duplicated, or whatever), the Command Processor displays a message and a status code is returned to the UI. Dialog Manager 60 (or another UI component) continues or aborts the command. If there was no error, the Command Processor executes the command. Any error conditions occurring during execution are also posted to the user by the Command Processor. The CCB is destroyed by the Command Processor, which has detailed knowledge of the parameters in it. The Command Processor returns to Dialog Manager 60 with a status code and Dialog Manager 60 returns to Raw Event Processor 68. Raw Event Processor 68 returns the status code to the Spreadsheet Services layer. Finally, the Spreadsheet Services layer returns the appropriate code to the spreadsheet program.

Note that Raw Event Processor 68 makes no decisions about which CCB is associated with the command id it is passing to the UI. Dialog Manager 60 (or other UI Component) requests a CCB, which it then dispatches. Also, if the UI component does not want to deal with a CCB directly, it can use Non-CCB API 72 to construct one, given a customized set of inputs. This CCB can then be dispatched through CCB API 70.

Processing of a command with no UI is handled as follows. In this example, it is assumed that a versionable spreadsheet @function is invoked during a recalculation. The spreadsheet program calls the registered @function routine in the Spreadsheet Services layer. The Spreadsheet Services DLL gets the @function's arguments from the spreadsheet and packages them up in the appropriate data structure. It then calls the registered Raw Event Processor routine, passing the command id and a pointer to the data structure. Raw Event Processor 68 knows that this command does not involve any UI and constructs a CCB for the command, using CCB API 70 and perhaps Non-CCB API 72 as well. Whether or not the non-CCB API is used would depend on how much knowledge of @functions would be required to translate the incoming argument data structure into a CCB.

Next, the CCB is dispatched to an @function Command Processor. The Command Processor computes the @function's value, and uses the Spreadsheet Services layer to register that return value with the spreadsheet program. The Command Processor then destroys the CCB and returns to Raw Event Processor 68. Raw Event Processor 68 returns to the Spreadsheet Services DLL.

This second example shows that there may be cases where Raw Event Processor 68 is the module that constructs a CCB out of parameters provided from the spreadsheet via the Spreadsheet Services DLL. In cases where the translation is straightforward (e.g. copy argument 1 to parameter 1 in the CCB), this is done in-line. In other cases, customized translation routines may be provided. These would reside in Non-CCB API module 72.

2. Event Handling

Event Manager 18 is the only client that registers with the Spreadsheet Services DLL for events. All Event Manager callback routines have the same prototype, consisting of the event id, a flag indicating whether this is a Before or After notification, and a pointer to an argument data structure. The argument data structure pointer is passed as a void *, and is cast to a particular structure pointer based on the command id. The actual data structure is, therefore, customized to the event in question. All event handlers reside in Raw Event Processor 68.

3. Supported Events

Appendix II is a list of commands, with a brief description of each. Each command corresponds to a single CCB. There are no CCBs which are used only for querying information. CCBs by definition change the state of versionable spreadsheet data. There is an API in Object Manager 48 (see FIG. 12) for querying the state of the versionable spreadsheet addin.

Settings Storage Manager 52 can be called directly to set and query settings. Individual Command Processors are responsible for updating sticky values in their CCBs.

4. Interface to Spreadsheet Services

Part of the Event Manager's initialization involves registering with the Spreadsheet Services layer for all relevant spreadsheet events. A table is maintained in memory containing the event codes, type of event (before, after), and category (UI, non-UI). The table is used to decide at runtime whether a given event is to be dispatched to Notification module 66, or directly to CCB API 72. Events with UI support go through the Notification service to registered clients, others go directly into the versionable spreadsheet addin via a CCB. The Spreadsheet Services API is also used by Event Manager 18 in some cases to help process data (the number stack, for example).

D. Command Control Block (CCB)

Command Control Blocks (CCBs) are a central feature of the versionable spreadsheet architecture. They encapsulate all the relevant information required to execute a user command. The primary objective of the CCBs is to isolate the UI of the versionable spreadsheet addin from the code that implements the underlying functionality. The following describes the structure of a CCB and the routines used to manipulate it.

Each CCB stands complete on its own. No CCB depends on information contained in another. Because of this, CCBs are not designed to be of fixed size. Each has a fixed size header which provides a unique command identifier, some additional information about the particular command, and a count of the arguments associated with the command.

The header is followed by an array of parameter structures. The array contains one entry for each parameter to the command. Each command has a fixed number of parameters, but the number varies from command to command. The parameter is a fixed size data structure, so that the CCB API, knowing the number of parameters in a CCB, can allocate the entire CCB in one chunk of memory.

The versionable spreadsheet addin maintains a "CCB database", which can be thought of as a table containing a template for each parameter of each CCB defined in the system. The table contains the following information:

* Number of table entries (CCBs)
* For each CCB:
  * command id
  * number of parameters
  * CCB flags
  * command text (string representing command for debugging)
  * For each parameter:
    * parameter flags
    * data type code
    * default value reference The parameter flags include attribute flags and validation flags. Attribute flags supply additional information about a parameter or about the command as a whole. Validation flags indicate to the Command Processor how much validation has been done on the parameter. Both sets of flags are command specific.

The CCB database is statically compiled into the Event Manager. The default value reference for each parameter is the name of a user settable preference. If there is a default value for a parameter, the Settings Storage Manager can be queried to get the current setting of the preference.

An individual parameter's flags in the table indicate what kind of default value is associated with the parameter, if any. There are choices, namely, preferred default, no default, and "sticky" default. If the flags indicate preferred default, the table contains the name of a preference setting as a literal string (null terminated) or an integer. The Settings Storage Manager is queried with the preference name and optional file handle to get the current setting. If the flags indicate no default, there is no default value. In this case, a place holder is used in the table (usually 0). If the flags indicate "sticky" default, the default value is whatever the value was the last time the user executed the command for the current workfile. In this case, the Settings Storage Manager is queried for the current value. There is no preference id, rather the SSM forms an id based on the command id of the CCB and the parameter position.

1. Use of CCBs in Event Manager

Referring again to FIG. 12, CCBs are transient objects. They are created by Event Manager 18, and destroyed by their associated Command Processor 44. Each CCB is matched with a unique Command Processor (though it may also be the case that a single Command Processor handles more than one CCB).

Though CCBs belong conceptually to Event Manager 18, they are used in other components, notably Command Dispatcher 42, UI, and the individual Command Processors 44. As a result, the exported information resides in its own header file.

The normal sequence of operations that are performed on a CCB are as follows. Event Manager 18 receives an invocation from a UI component (e.g. dialog, menu pick, etc.) with a command id. At this point, at least syntactic validation has occurred. Event Manager 18 creates an "empty" CCB. Then, Event Manager 18 fills in the parameters and flags on the CCB, based on the in-memory CCB table. Default parameters may be filled in from SSM 52. The Event Manager returns control to the UI, which completes the CCB based on user input. After the CCB has been filled in, the appropriate Command Dispatcher 42 dispatches it. The dispatched CCB is received by a Command Processor 44 which extracts arguments and performs validation, if necessary. The Command Processor 44 executes the command, saving Undo information as necessary. Sticky values, if any, are updated in SSM 52. Finally, the Command Processor 44 destroys the CCB.

2. Use of CCBs in the UI

Because CCBs are to some extent table driven, there is an opportunity for some UI components to leverage their use.

A routine is provided which fills up all the parameters of a CCB with default values obtained from SSM 52. UI components are free to use this feature, but they must get involved with CCBs directly to do so.

UI components may deal with CCBs in the following way. An event notification from Event Manager 18 (e.g. a menu pick which causes a dialog box to appear) activates a UI component. The UI component requests Event Manager 18 to create a CCB for the command, and the default parameter values are filled in. Then, the UI component extracts default values from the CCB and proposes values to the user in the dialog. When user input is complete for the command, the actual selected values are put back into the CCB. Then, the CCB is passed back to Event Manager 18 for dispatch to a Command Processor 44. Finally, when the command has been validated and executed successfully, any "sticky" values which the UI component wants saved for the next time the command is executed are passed back to SSM 52 in the CCB (via a CCB call).

The macros listed in Appendix III are used to set and retrieve information in the parameter structure. They are defined as if they were routines.

The following functions are also implemented for CCBs. A Create() function allocates memory for a CCB. It checks the internal CCB table and initializes the CCB with the correct number of parameters. A Destroy() function deallocates the CCB's memory. A FillDefaults() function looks Up all relevant user preferences and defaults in the CCB database (and possibly queries SSM 52), and copies the parameters into the CCB parameter structures. An Init() function is called during startup and is called after the resource manager is initialized. A SetStickyValues() function sets sticky values.

E. Object Manager

There was previous discussion of how VS objects (spreadsheet, range, alternative, etc.) are organized and implemented. This section describes how clients within the versionable spreadsheet addin use Object Manager 48 (shown in FIG. 12) to access those objects.

The basic goal of Object Manager 48 is to provide quick and efficient access to VS objects, usually by name. Object Manager 48 can be thought of as the public interface to all VS objects, hiding from its clients the details of how lists and collections of the objects are internally organized and accessed. It provides a set of public functionality for creating, destroying, finding and performing fixups on the various versionable spreadsheet entities.

Object Manager 48 has three top level data components, and three distinct sets of API. The data components are:
* The File List
* The User Name Table
* Workspace settings The three categories of API for Object Manager 48 are:
* Initialization and termination functions
* Control functions
* Iteration functions Each of these will now be described.

As noted earlier, the top level object in the described embodiment is a Spreadsheet. The Spreadsheet object organizes all Ranges and Scenarios belonging to a given spreadsheet workfile. Each range in turn manages a list of Alternatives. It is the Object Manager's mission to organize the list of spreadsheet files present in the workspace. Object Manager 48 can be thought of as an implementation of a workspace "object", which sits above the file objects in the hierarchy. One major difference between Object Manager 48 and a real C++ workspace object, however, is that the Object Manager's API is callable by C.

A User Name Table is provided for compatibility with a network environment. It always contains a single entry at position 0: "Unknown". This entry is used to identify the current user when an actual name cannot be determined. The actual string comes from the resource file. Entries in the User Name Table are used by Audit event objects to refer to the user performing the action which creates, modifies, or deletes versionable spreadsheet objects. Referring to FIG. 13, each Spreadsheet object 82 maintains a User Name Table 113 comprising a set of user names for all people who have created or modified objects in that workfile. Assumption Manager 30 determines the user's name at startup time from a component of the operating system, such as a network LAN manager or from an E-mail package.

The settings of the SSM API may also be stored in Object Manager 48 and in the object hierarchy, specifically in the Spreadsheet objects. SSM 52 maintains settings at two levels: workspace, or "global" settings, which apply across all workfiles; and file level settings. In order to avoid duplication of code for hierarchy management (searching for and creating nodes in the workspace/file hierarchy), the functionality of SSM 52 is combined into Object Manager 48 (for the workspace settings) and Spreadsheet objects (for file settings).

The SSM API is the public interface to SSM functionality, and the SSM is treated conceptually as a separate piece of the architecture (see below). Internally, however, settings are stored in the object hierarchy.

The single Object Manager object and each Spreadsheet object contains an embedded instance of a Settings class. This embedded object maintains a list of settings, which are themselves an id associated with a value.

Object Manager 48 has an initialization function OMInit() and a termination function OMTerminate(). OMInit(), which is called after the Resource Manager has been initialized, initializes the Object Manager and sets up the File List. OMTerminate() ensures that all memory allocated in the object layer is deallocated.

The set of control functions implemented by Object Manager 48, and the VS objects to which they apply are:
* Find: Spreadsheet, Range, Scenario, Alternative
* Destroy: Spreadsheet, Range, Scenario, Alternative
* Create: Spreadsheet, Scenario, Alternative
* Perform fixups: Range, formulas Iteration functions are used to apply a client defined function to all instances of a particular object. A callback is provided by the client and that routine is invoked for each occurrence of the requested item. Iteration over the following items is supported:
* Spreadsheets
* Scenarios by file
* Ranges by file
* Ranges by scenario
* Alternatives by range
* Alternatives by scenario Some functions relating to Alternatives and Scenarios require a sequence number. If a non-zero positive number is given, then that number specifies a particular Alternative or Scenario (if it exists). If a sequence number of 0 is given, the operation is performed on the Alternative or Scenario of the given name with the highest sequence number (ie., on the last object created of the specified name). A negative sequence number is translated into an offset from the highest number. If, for example, the highest numbered Alternative of a particular name is 10 and a client specifies a sequence number of −1, then the 9th alternative is used.

The following control functions are also implemented for Object Manager 48. The control functions fall into the following groups: find functions, create functions, destroy functions, fixup functions and other miscellaneous functions.

Among the group of find functions are the following. An OMFindSpreadsheet() function returns a pointer to a spreadsheet object whose name matches the path. Two functions, OMFindRange() and OMFindRangeHdl(), return a pointer to a Range object, given a range name. The first function takes a pathname; whereas the latter function takes a spreadsheet object pointer. Two functions, OMFindScenario() and OMFindScenarioHdl(), find a scenario given a scenario name. Two functions, OMFindAlternative() and OMFindAlternativeHdl(), given a workfile, a range and an alternative name, find the alternative. The first function takes a name; whereas the latter function takes a range object pointer.

The group of create functions includes the following. An OMCreateSpreadsheet() function instantiates a spreadsheet object in the Object Manager. An OMCreateScenario() function creates a new scenario for a given workfile. An OMAppendAlt() function adds an alternative to a scenario at the last position. An OMCreateAlternative() function a takes a workfile path and a range, and creates an alternative and saves the current contents of the range as part of the new Alternative. There are also corresponding functions to the last three named but take a pointer to an object instead of a pathname.

Note that there are no create functions for ranges. This is because ranges are only created implicitly, usually when the first alternative belonging to a range is created.

Among the destroy functions are the following. There are two functions, OMDestroySpreadsheet() and OMDestroySpreadsheetHdl(), that free up all versionable spreadsheet program memory associated with the workfile, including all ranges, scenarios and alternatives; the former takes a pathname and the latter takes a handle. There are two functions, OMDestroyScenario() and OMDestroyScenarioHdl(), that destroy the specified scenario but do not destroy any of the scenario's alternatives; the former takes a pathname and the latter takes a handle. There are two functions, OMRemoveAlt() and OMRemoveAltHdl(), that remove the specified Alternative from the specified Scenario. There are two functions, OMDestroyRange() andOMDestroyRangeHdl(), that delete a range and all of its alternatives. There are two functions, OMDestroyAlt() and OMDestroyAltHdl(), that destroy a specified Alternative.

In addition, a set of fixup functions are supported. Certain events require that formulas residing in Alternatives containing certain references need to be "fixed". The list of events that necessitate fixup are:
1. A referenced range name is deleted. (A referenced range is a named or unnamed range which is used in a formula.)
2. A referenced unnamed range is moved.
3. A row, column or worksheet is inserted such that it intersects a referenced unnamed range, causing it to expand.
4. A row, column or worksheet is deleted such that the deletion intersects a referenced unnamed range, causing it to contract.
5. An unnamed range reference expands or contracts because one of its corners is moved.
6. A row, column or worksheet is deleted such that an entire referenced unnamed range is deleted.

7. A referenced unnamed cell or range "disappears" because another range or cell was moved on top of its location.
8. The user creates a named range, specifying as its location a referenced unnamed cell or range.

The versionable spreadsheet addin registers for and monitors all spreadsheet events which could result in any of the above situations.

For each of the above events, the appropriate action to be taken by the versionable spreadsheet addin is as follows.
1. If a referenced range name is deleted, the reference is converted to the range's coordinates (e.g. @sum(-FRED) →@sum(A1..C5)).
2. If a referenced unnamed range is moved, the reference is updated to the new coordinates.
3. If a row, column or worksheet is inserted such that it intersects a referenced unnamed range, causing it to expand, the reference is updated to reflect the new extent of the range.
4. If a row, column or worksheet is deleted such that the deletion intersects a referenced unnamed range, causing it to contract, the reference is updated to reflect the new extent of the range.
5. If an unnamed range reference expands or contracts because one of its corners is moved, the reference is updated to reflect the new extent of the range.
6. If a row, column or worksheet is deleted such that an entire referenced unnamed range is deleted, the reference is changed to the "error constant", represented in the spreadsheet as ERR.
7. If a referenced unnamed cell or range "disappears" because another range or cell was moved on top of its location, the reference is changed to the "error constant", represented in the spreadsheet as ERR.
8. If the user creates a named range, specifying as its location a referenced unnamed cell or range, the reference is converted to a named reference (e.g. @sum(A1..C5) →@sum(FRED)).

Among the miscellaneous functions are the following. An OMGetCurrentFile() function returns the pathname of the current spreadsheet file. An OMGetCurrentAlt() function returns the name and sequence number of the current alternative for the given range. There are also functions corresponding to the above three functions that use handles rather than pathnames.

Object Manager 48 also implements a set of iteration functions. The iteration functions invoke a client supplied callback procedure with information about the set of objects over which the iterator operates. Object Manager 48 supports two flavors of callback procedure: one is passed strings, the other is passed pointers to actual versionable spreadsheet objects.

Each client callback function returns a boolean value: TRUE to continue iteration, FALSE to stop. Each also has an argument for passing arbitrary client data to the callback. A list of iterator callback types is as follows:
Spreadsheets
Spreadsheet handles
Scenarios in a workfile
Handle based scenarios in a workfile
Ranges in a workfile
Handle based ranges in a workfile
Ranges in a Scenario
Handle based Ranges in a Scenario
Alternatives in a Range
Handle based Alternatives in a Range
Alternatives in a Scenario
Handle based Alternatives in a Scenario
Formulas in a workfile
Handle based formulas in a workfile The iterator API includes the following pairs of iterator functions, the first function in the pair takes a pathname and the second function in the pair takes a handle. Two functions, OMIterSpreadsheet() and OMIterSpreadsheetHdl(), iterate over workfiles on the desktop. Two functions, OMIterScenario() and OMIterScenarioHdl(), iterate over scenarios in a workfile. Two functions, OMIterRangeFile() and OMIterRangeFileHdl(), iterate over named ranges in a specified workfile. Two functions, OMIterRangeScen() and OMIterRangeScenHdl(), iterate over ranges in the specified scenario. Two functions, OMIterAltRange() and OMIterAltRangeHdl(), iterate over Alternatives in the specified Range. Two functions, OMIterAltScen() and OMIterAltScenHdl(), iterate over Alternatives in a Scenario. Two functions, OMIterForm() and OMIterFormHdl(), iterate over all formulas in a workfile.

F. Settings Storage Manager

Referring again to FIG. 12, the Settings Storage Manager (SSM) 52 is responsible for maintaining two categories of information, namely, workspace settings and workfile settings. The first group of settings are global to all files open. These include all workspace user preferences and all other default settings which the versionable spreadsheet addin maintains for the workspace. The second group includes all settings specific to a single workfile. These include such things as the name of the current workfile, the name of the current range, etc. Each "item" or "setting" stored in SSM 52 is tagged with a persistence attribute. Items which are persistent are saved on disk, others are not. A setting consists of a unique id and an associated value. All settings maintained by SSM 52 are accessed by their identifiers: either a name or an integer id.

There are two distinct components to SSM 52, namely, the external API and a collection of classes. The C-callable API provides the versionable spreadsheet addin with the ability to set and retrieve both workspace and workfile settings. Each of these settings can be defined to be persistent and therefore would be saved to the appropriate file. A collection of setting-related classes implement the specifics of creating, manipulating and tracking setting(s). Instances of these classes are incorporated in the Object Manager class.

The model of operation is that new entries in SSM 52 are created when the first "set" is done for an item. Succeeding "sets" modify the existing entry.

The values maintained by SSM 52 come from the following sources:
1. an initialization (.INI) file;
2. a spreadsheet file;
3. sticky values from CCBs; and
4. UI state data from CCBs or direct calls.

The initialization file contains all user settable preferences. The scope of these settings is the workspace and the settings all have string literal names.

The spreadsheet file contains all "sticky" values. A "sticky" value is a value which is changeable by the user, but the default is the value used the last time the command was executed in the same file. The current set of sticky values is stored in the worksheet file when the user performs a File Save. When a file is opened, these are read into SSM 52. The scope of these values is the workfile, and each workfile has its own set. These settings typically have integer ids.

The CCB's affect the values stored in the SSM in the following manner. As the user executes commands in the spreadsheet, CCB structures are used to update saved sticky values in SSM 52. These settings typically have integer ids, formed as a combination of the command id and the parameter position in the CCB. As the user performs non-command actions in the spreadsheet (navigation, for example), CCBs are generated by Event Manager 18 which communicate state information to SSM 52. The scope of some of these states is the workspace (e.g., which spreadsheet file is active), while others are specific to a workfile (name of current range). These settings have integer ids, except when they are stored to the .INI file.

Other modules may use SSM 52 to store temporary or persistent settings and state data. These settings may have either string or integer ids, though the integer ids are recommended.

Figure 17:
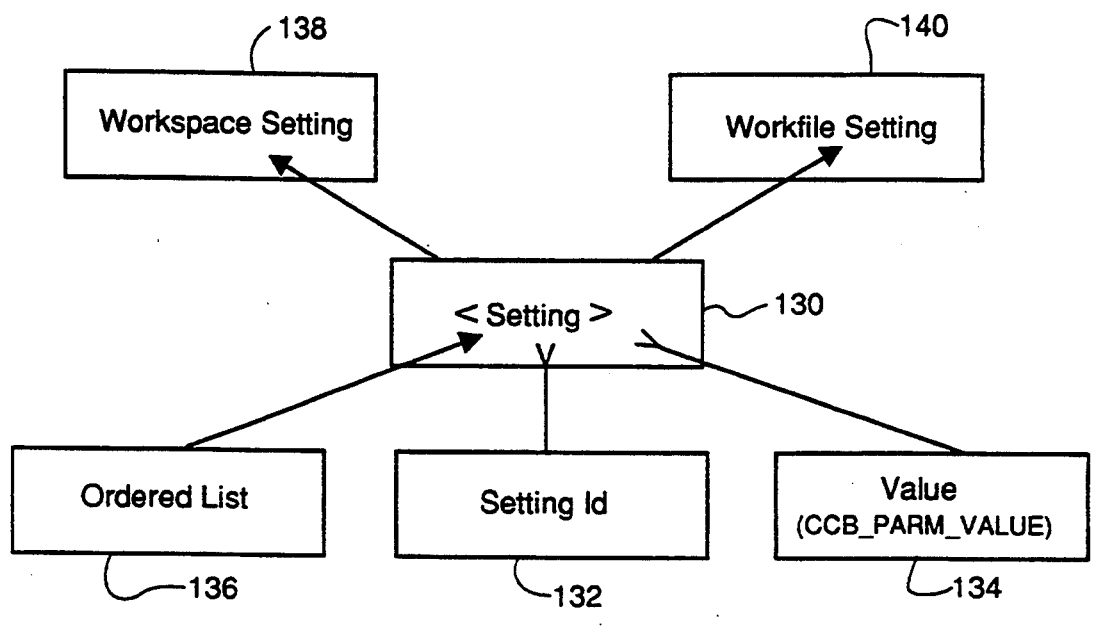
FIG. 17 shows the Settings Storage Manager class hierarchy.

The SSM class hierarchy is as shown in FIG. 17. An abstract class Setting 130 contains a SettingId 132 and a value 134 for a setting. It also inherits from the OrderedList class 136, enabling it to be a node in an ordered (doubly-linked) list and enabling it to search, insert and remove items from a list.

There are two subclasses which inherit from Setting class 130, namely, WorkspaceSetting 138 and WorkfileSetting 140. Both of these classes supply a corresponding set of virtual methods. The list of WorkspaceSetting(s) uses a single allocated memory manager heap. Each list of WorkfileSetting(s) per workfile exists within the heap for the Spreadsheet object.

Figure 18:
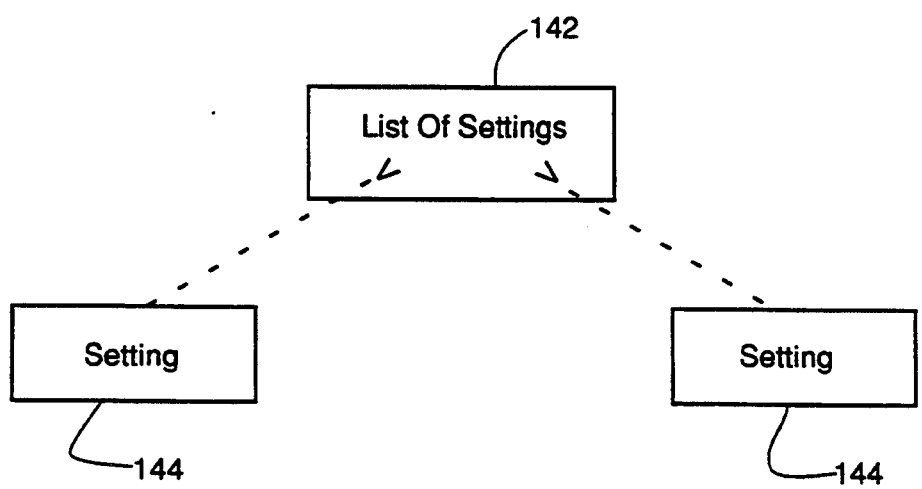
FIG. 18 illustrates the ListOfSettings class.

Referring to FIG. 18, a ListOfSettings class 142 maintains a list of Setting objects 144, specifically by referencing the head and tail of a list. It also provides methods for adding, removing, and locating settings in the list. The SSM API invokes these methods to implement exported functions such as ones which retrieve settings from SSM 52 and enter settings into SSM 52. Instances of this class are maintained by Object Manager 48.

Object Manager 48 maintains a list of settings for the workspace and one list of settings for each spreadsheet object it is managing. When constructed, Object Manager 48 ensures that the workspace settings are loaded from the .INI file. As each spreadsheet object is constructed, it will have a corresponding collection of settings.

Each setting object maintains a flag indicating whether that item is to be saved on disk. Workspace items are saved in the .INI file. Workfile items are saved in the appropriate spreadsheet or workfile. The "to save or not to save" flag is set optionally at the time the item is constructed. The external API provides calls to query and set the persistence of a setting; internally, Setting class 130 has methods to achieve this.

The Object Manager API provides a call to save the workspace settings. It also provides a call to initiate the saving of a spreadsheet, which in turn initiates the saving of all persistent setting for that particular spreadsheet. Marking an item as persistent does not automatically cause it to be saved to disk. The Object Manager save operations are invoked to accomplish this.

G. Implementation of Linked Lists of Cell Contents Objects

As noted above in connection with the description of the cell contents objects 100, 102 and 104 shown in FIG. 13, these linked lists are sparse and do not contain duplicate information. A detailed description of the structure of the lists and their use will now be given.

Figure 19:
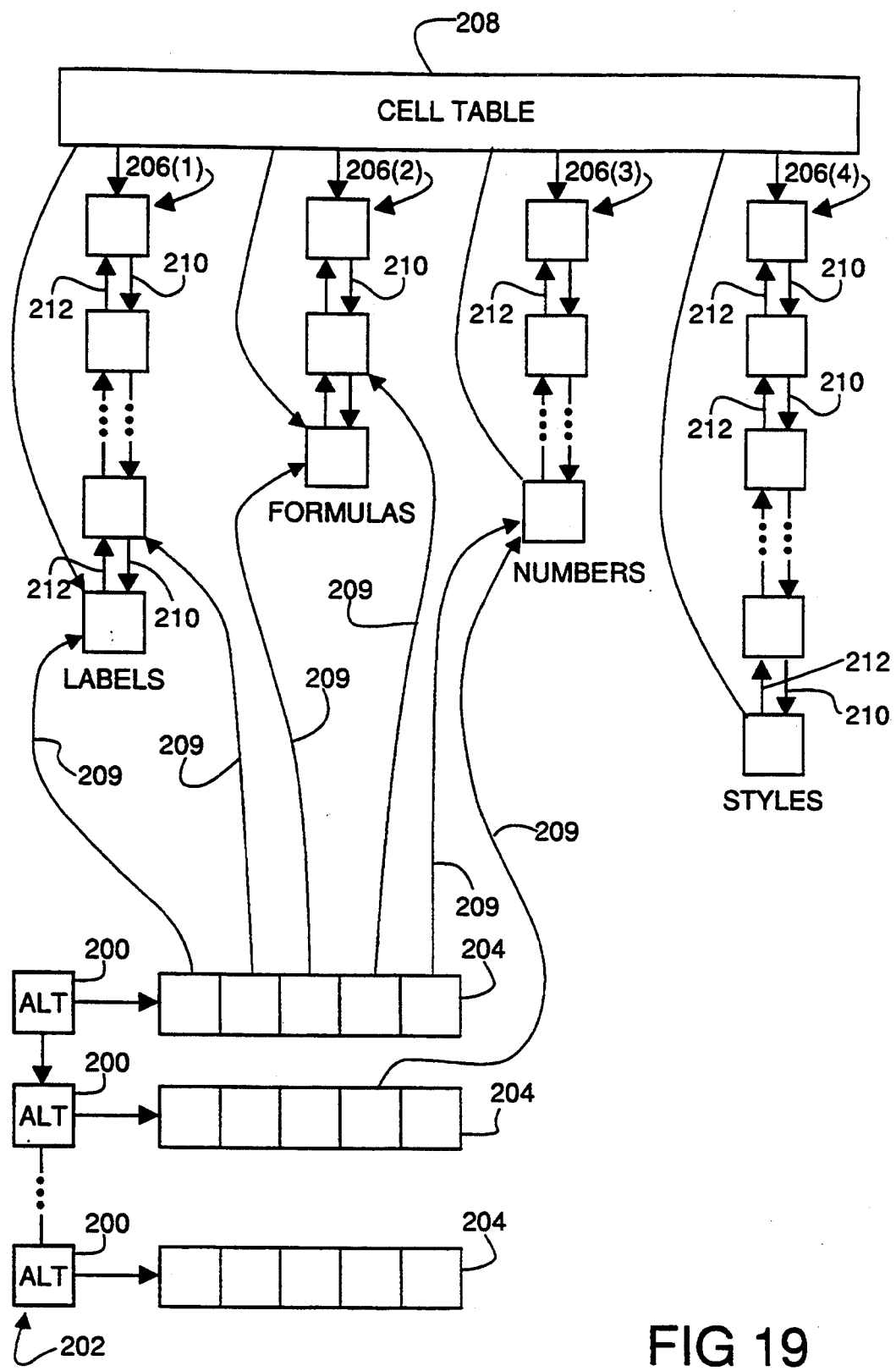
FIG. 19 shows the cell table and the doubly linked lists of cell contents objects.

Referring to FIG. 19, each alternative object 200 is part of an ordered list 202 of alternatives for the spreadsheet and each alternative object 200 owns a corresponding array of cells 204 for that alternative. Each entry in array of cells 204 holds a pointer 209 that points into one of four ordered lists 206(1-4) owned by a cell table 208. The data structure to which pointer 209 points holds the value of the cell for that alternative. Cell table 208 identifies the head and the tail of each of lists 206(1-4). Thus for label ordered list 206(1), cell table 208 includes a pointer 205 that points to the first entry of ordered list 206(1) and a pointer 207 that points to the last entry of ordered list 206(1). Similarly, cell table 208 includes pointers 205 and 207 for the other three ordered lists 206(2-4).

All four of ordered lists 206(1-4) that are accessible through cell table 208 are sparse, doubly-linked, ordered lists in which the contents are stored and indexed by hash value and in which contents are not stored in duplicate. Thus, for example, if there are several alternatives in a given range, each including a cell containing the same label, that label appears in label ordered list 206(1) only once and the corresponding cells for the different alternatives all point to that entry, i.e., the only entry in the linked list that contains that label.

Continuing with labels as an example, the construction of the doubly linked lists will now be described. Each entry in doubly-linked ordered list 206(1) includes a forward pointer 210 to the next entry in the list and a backward pointer 212 to the previous entry in the list. At either end of the list, a null pointer is used in the appropriate field to indicate that the entry is either the first or last entry in the list. Thus, the backward pointer for the first entry in the list and the forward pointer for the last entry in the ordered list are both null pointers.

The labels that are stored within the ordered list are ordered on the basis of a two-byte hash value. Thus, a field in each entry in the ordered list includes the hash value for the label that is stored there. The technique for computing the hash value is not of primary importance. Hash values may be calculated using any convenient technique such as, for example, a simple XOR operation. What is important, however, is that once the hash value is computed, the corresponding label is stored within the ordered list in order of its hash value. Since more than one label may yield the same hash value, hash values that appear in the ordered list may be duplicated. But any given label appears only once in list 206(1).

Formulas list 206(2), numbers list 206(3), and styles list 206(4) are constructed similarly to ordered list 206(1). In the described embodiment, hash values for formulas are computed from the sequence of bits that represent the formula. Hash values for numbers are computed from the bit sequence for the number.

Figure 20:
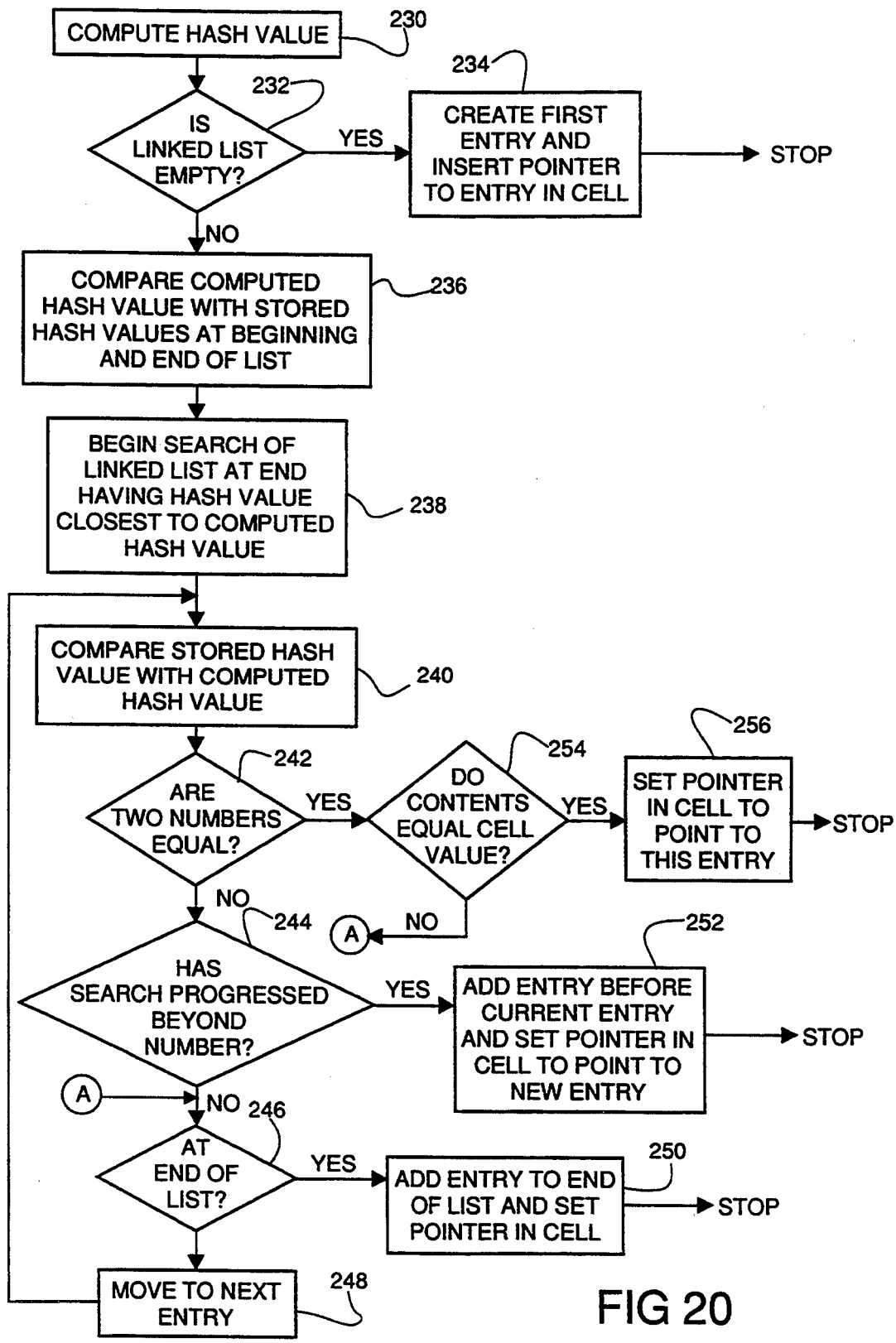
FIG. 20 presents the algorithm for adding new information to the linked lists shown in FIG. 19.

Adding a new entry into an ordered list is achieved by the following sequence of operations. Referring to FIG. 20, first, the object manager computes the hash value of the information that is to be stored in the ordered list (step 230). Then, the object manager determines whether the ordered list is empty (step 232). If it is empty, the entry goes in as the first and only entry in the list and the pointers in the cell table are updated to point to that entry (step 234). If there are other entries in the ordered list, the object manager compares the current hash value for the new entry to the hash values for the entries at the beginning and at the end of the ordered list (step 236). The object manager begins the search through the ordered list at whatever end contains the hash value that is closest to the hash value for the new entry (step 238).

Next, the object manager searches forward (or back, depending at which end the search begins) through the ordered list to find an entry either with a matching hash value or with a hash value that is beyond the computed hash value. A list iterator object contains a method which performs this search through the ordered list one entry at a time and compares the hash values. At each entry, the iterator compares the computed hash value with the stored hash value (step 240) and checks whether the two numbers are equal (step 242). If the stored hash value found in the current entry is not equal to the computed hash value, the object manager tests whether the stored hash value is "beyond" the computed hash value (step 244). For a forward search, the stored hash value is "beyond" the computed hash value if it exceeds the computed hash value. For a backward search, the stored hash value is "beyond" the computed has value if it is less than the computed hash value. If the search has not progressed "beyond" the computed hash value, the object manager then checks whether the current entry in the ordered list is the "last" entry (step 246). If the field containing the pointer identifying the next entry does not contain a null pointer, the search has not reached the end of the list. In that case, the object manager moves to the next entry, as identified by the pointer stored in the entry, and repeats the just-described sequence of operations (step 246).

At some point in the search one of three outcomes will occur: namely, the search will reach the end of the list without finding a matching hash value, the search will go "beyond" the computed hash value, or the search will find a matching hash value. If there is no matching hash value within the ordered list, eventually the test performed at step 246 will yield a TRUE. In that case, the object manager adds a new entry to the end of the list and sets the pointer in the cell of the range/alternative to this new entry (step 250). The object manager also sets the use number of the cell contents object thus created equal to one.

If in step 244 it is determined that the search has progressed "beyond" the computed hash value, the object manager adds a new entry before the current entry and sets the value of the pointer in the range/alternative cell accordingly (step 252). As in step 250, the object manager also sets the use number of the new cell contents object to one.

If the object manager finds a matching hash value in step 242, then the object manager checks whether the stored value is equal to the value that is to be stored (i.e., the contents of the cell in the range/alternative) (step 254). Note that even though the contents stored in the ordered list are not duplicated, the hash values may be. In other words, for example, more than one formula may result in the same hash value. Thus, the object manager must determine which entry having a matching hash value also contains the information that the object manager is attempting to store in the ordered list.

If in step 254 the object manager finds an entry that already stores the information, it sets the value of the pointer in the range/alternative cell to point to that entry (step 256). The object manager also increments the use value of that cell contents object to accurately indicate the total number of cells within the spreadsheet(s) that are using information stored in that object.

If in step 254 the object manager determines that the stored value is not the same as the value to be stored, it moves to step 246 to determine whether it has reached the end of the ordered list. From that point it proceeds as previously described, until either the entry is found or a new entry is created in the proper location within the ordered list.

With this construction, finding entries in the ordered lists is fast in comparison to alternative approaches. Moreover, the technique efficiently stores cell information and avoids wasting memory by storing duplicates.

Note whenever the contents of cells in a range/alternative are changed or cells are erased, the use counts of the cell contents objects in the ordered lists are revised accordingly to indicate that fewer cells are now using that stored data. When the count on an object reaches zero, then it can be removed from the list and destroyed, freeing its memory.

Other embodiments are within the following claims.

Appendix I

The following is a list of the @functions and macros that are implemented by the versionable spreadsheet addin.

@CELLINFO(option, cell, range, alternative[, user id])

This function returns the value or contents of the specified cell in the specified alternative.

| Option | What it does |
|---|---|
| formula | Returns the cell's formula as a string or NA if the cells does not contain a formula |
| value | Returns the cell's value or ERR if the cell does not contain a value |

@STATUS(option, alternative ¦ scenario[, user id])

This function returns information about the status of an object, i.e., an alternative, a scenario, a range, or an open worksheet file. The information returned depends on the option specified.

| Option | What it returns |
|---|---|
| creator | The name of the person who created the object |
| modifier | Name of the object's last modifier |
| created | Date/time of creation |
| modified | Date/time of last modification |
| note | The annotation (truncated) |
| protected | 1 if yes, 0 if no |
| hidden | 1 if yes, 0 if no |

Note that the spreadsheet application program uses an order of precedence when evaluating object with a range name. If no match is found, the program tries to match object with a scenario name. If no match is found, the program then tries to match object with an alternative name.

@CURRENT(range)

This function returns the name (if any) of the current alternative for the given range.

@USER

This function returns the name of the current user.

@RANGENAME(cell)

This function returns the name of the range in which cell is located.

@LASTSCENARIO ()

This function returns the name of the most recent Scenario displayed in the spreadsheet (the currently active file). It returns an empty string if no Scenario was displayed since the file was opened.

{ALTERNATIVE option, range, alternative [, user id]}

This macro creates, displays or deletes alternatives. The options are as follows:

| Option | What it does |
| --- | --- |
| create | Create a new alternative from the contents of the range. |
| display | Display the specified alternative. |
| delete | Delete the specified alternative. |
| update | Update the alternative with the contents of the range. |

{SCENARIO option, scenario[, user id][, range, alternative[,user id]]}

This macro creates, displays, deletes or appends to a scenario. The options are as follows:

| Option | What it does |
| --- | --- |
| create | Create a new scenario in the current workfile. |
| display | Display a scenario in the spreadsheet. |
| delete | Delete a scenario from the current workfile. |
| append | Add an alternative to a scenario. |
| remove | Remove an alternative from a scenario. |

APPENDIX II

The following is a list of commands and corresponding CCB's that are supported in the described embodiment:

| CCB | Description |
| --- | --- |
| Generate Range name | Generate a name for a specified range in a specified file. |
| Generate Alternative name | Same idea as for range names |
| Create Alternative (Save As) | Create a new Alternative in the specified range, using the specified name |
| Modify Alternative (Save) | Replace the contents of the specified Alternative from the spreadsheet |
| Modify annotation | For the given object, replace its existing annotation with the specified text. |
| Modify macro | Same for macros |
| Display Alternative (Retrieve) | Copy the contents of the specified Alternative to the spreadsheet. Optional flag indicating whether a spreadsheet GoTo should be performed. |
| Delete Alternative | Delete the specified Alternative |
| Purge Alternatives | Delete all Alternatives of the specified name in the specified range, except the one with the highest sequence number. |
| Delete Range | User has deleted the specified range from the spreadsheet |
| Undefine Range | The specified range has been undefined. |
| Count backup Alternatives | Given an existing Alternative name in a specified range, count the number of backup copies (not counting the highest numbered one) which exist. |
| Set Alternative | Protect or unprotect the specified protection Alternative. |
| Set Alternative hiding | Hide or unhide the specified Alternative. |
| Copy Alternative | Copy the specified Alternative within the specified range (new name required), or to another range (new name optional). |
| Insert/Delete Row, Column or Worksheet | User has performed an insert or delete operation; fix everything up. |
| Range moved | User has moved a range. Fix everything up. |
| File Save | Save versionable spreadsheet data to disk. |
| File Open | User is loading an existing spreadsheet file; load versionable spreadsheet data. |
| File New | User is creating a new spreadsheet. |
| Undo | User has asked for Undo, spreadsheet is dispatching one or more items that were pushed on its undo stack. |
| Create Scenario (Save As) | Create a new Scenario given a name and a list of Alternative references |
| Delete Alternative Reference from Scenario | Given a Scenario and a reference to Reference from Scenario an Alternative, delete the reference from the Scenario. |
| Insert Reference into Scenario | Given a Scenario and an Alternative reference, insert the reference at the specified position. |
| Delete Scenario | Delete the specified Scenario. |
| Display Scenario (Retrieve) | Display the specified Scenario in the spreadsheet. |
| Protect/Unprotect Scenario | The usual function. |
| Hide/Unhide Scenario | The usual function. |
| @Function invocation | Specifies the opcode and arguments for the @func to be evaluated. |
| Macro keyword invocation | Specifies the keyword and arguments to be executed. |
| User navigation | User has moved the cell cursor to a new location. |
| Help | User has invoked context sensitive help. Topic is provided. |
| Names function key (F3) | User has invoked names list in the spreadsheet control line for a versionable spreadsheet @function. |
| Update user preferences | Workspace settings are written to disk. |
| Update setting in SSM | Given a file reference (NULL for workspace |

| CCB | Description |
| --- | --- |
| | setting) a setting id and a value, update the specified setting in SSM. |

APPENDIX III

The following is a list of macros that are used to set and retrieve information in the parameter structure. The functions of most of them are self-explanatory. Where that may not be true, a comment appears.

CCBGetParmPtr()

Given a pointer to the CCB header and the index of the desired parameter (0 based), this function returns a pointer to the parameter structure.

CCBSetParmDataType()

This function sets the parameter data type to the given code.

CCBGetParmDataType()

This function returns the current data type of the parameter.

CCBSetParmSize()
CCBGetParmSize()
CCBSetParmAttrs()
CCBGetParmAttrs()
CCBSetParmValidate()
CCBGetParmValidate()
CCBSetParmValue()
CCBGetParmValue()

What is claimed is:

1. A computer programmed to represent a spreadsheet that is displayed to a user, said spreadsheet comprising an array of cells storing user entered data, said programmed computer comprising:
   computer implemented means for designating a range of one or more cells within said spreadsheet as a group of one or more cells, said group of one or more cells containing a first set of user entered data, said range containing less than all of the cells of said spreadsheet;
   computer implemented means for creating an alternative for said range of one or more cells in said spreadsheet, said alternative containing a second set of user entered data that is different from said first set of user entered data; and
   computer implemented means for displaying a list of alternative sources of data that are available for said range in said spreadsheet, said list of alternative sources of data including said alternative;
   computer implemented means for designating said alternative on said list of alternative sources of data; and
   computer implemented means for selecting the designated alternative as the source of the data that is used in the range of one or more cells within said spreadsheet.

2. The programmed computer of claim 1 wherein said group of one or more cells is a range of contiguous cells within said spreadsheet.

3. The programmed computer of claim 2 further comprising means for generating one or more event objects that are linked to said alternative, said one or more event objects containing historical information about said alternative.

4. The programmed computer of claim 3 wherein historical information includes a date of creation of said alternative and a name of a user who created said alternative.

5. The programmed computer of claim 3 further comprising means for modifying said alternative and wherein said historical information includes a date of modification of said alternative and a name of a user who modified said alternative.

6. The programmed computer of claim 2 further comprising means for generating a note object that is linked to said alternative, said note object containing userentered annotations.

7. A computer programmed to represent a spreadsheet that is displayed to a user, said spreadsheet comprising an array of cells storing user entered data, said programmed computer comprising:
   computer implemented means for designating a range of one or more cells within said spreadsheet as a group of one or more cells, said group of one or more cells containing a first set of user entered data elements, said range containing less than all of the cells of said spreadsheet;
   computer implemented means for generating a plurality of alternatives for said range of one or more cells in said spreadsheet, each alternative of said plurality of alternatives containing a corresponding set of user entered data elements that is different from said first set of user entered data elements and from the set of user entered data elements for the other of said plurality of alternatives; and
   computer implemented means for displaying a list of said plurality of alternatives;
   computer implemented means for designating any alternative among the displayed list; and
   computer implemented means for selecting the designated alternative as a source of data that is used in said range of one or more cells within said spreadsheet.

8. The programmed computer of claim 7 wherein said group of one or more cells is a range of contiguous cells within said spreadsheet.

9. The programmed computer of claim 7 further comprising means for generating an ordered list for storing the user entered data elements of all the plurality of alternatives.

10. The programmed computer of claim 9 further comprising means for generating a hash value for the user entered data elements of the plurality of alternatives and wherein the user entered data elements for the plurality of alternatives is stored in the ordered list in order of the generated hash values.

11. The programmed computer of claim 10 wherein the list includes a plurality of entries each of which stores a unique data element of said user entered data elements of said plurality of alternatives and having a hash value derived for the data element stored therein, the entries in said list being sequentially ordered by said hash values.

12. A computer programmed to represent a spreadsheet that is displayed to a user, said spreadsheet comprising an array of cells storing user entered data, said programmed computer comprising:
   computer implemented means for designating a plurality of ranges within said spreadsheet, each of said plurality of ranges in said spreadsheet being a corresponding plurality of cells from said array of cells, each of said plurality of ranges of cells containing an associated set of user entered data, each of the ranges of said plurality of ranges in said spreadsheet containing less than all of the cells of said spreadsheet;

computer implemented means for creating an alternative for each of said plurality of ranges in said spreadsheet, each of said alternatives containing an associated set of user entered data that is different from the user entered data associated with the range to which that alternative corresponds;

computer implemented means for enabling the user to designate a subset of said plurality of alternatives to form a scenario; and computer implemented means for displaying a list of alternative sources of data that are available for use in said spreadsheet, said list of alternative sources of data including said scenario;

computer implemented means for designating said scenario on said list of alternative sources of data; and computer implemented means for selecting the designated scenario as the source of data that is used in said plurality of ranges in said spreadsheet.

13. The programmed computer of claim 12 further comprising means for generating one or more event objects that are linked to said scenario, said one or more event objects containing historical information about said scenario.

14. The programmed computer of claim 13 wherein said historical information includes a date of creation of said scenario and a name of a user who created said scenario.

15. The programmed computer of claim 13 further comprising means for modifying said scenario and wherein said historical information includes a date of modification of said scenario and a name of a user who modified said scenario.

16. The programmed computer of claim 12 further comprising means for generating a note object that is linked to said scenario, said note object containing user-entered annotations.

17. A computer programmed to store a plurality of data elements, wherein at least some of said data elements in said plurality of data elements are duplicates, said programmed computer comprising:

computer implemented means for generating a hash value for each of said plurality of data elements; and computer implemented means for generating a list of entries, said list of entries storing all of said plurality of data elements, each of said entries holding a unique one of said plurality of data elements and having an associated hash value derived from that corresponding data element by said generating means, the entries in said list being sequentially ordered by said associated hash values.

18. The programmed computer of claim 17 wherein said list is a linked list.

19. The programmed computer of claim 18 wherein said list is a doubly linked list.

20. A computer implemented method of representing a spreadsheet, said spreadsheet comprising an array of cells storing user entered data, said computer implemented method comprising:

using a computer input device to designate a range of one or more cells within said spreadsheet as a group of one or more cells, said group of one or more cells containing a first set of user entered data;

using the computer to create an alternative for said group of one or more cells, said alternative containing a second set of user entered data that is different from said first set of user entered data, said group of one or more cells and said alternative representing user selectable alternative sources of the data that is used in said range of one or more cells within said spreadsheet; and using the computer to store both said spreadsheet and said alternative in a memory as part of a single computer readable file.

* * * * *